US012585769B1

(12) United States Patent
Naidoo

(10) Patent No.: US 12,585,769 B1
(45) Date of Patent: Mar. 24, 2026

(54) MULTI-AGENT SYSTEM IMPLEMENTING FEDERATED LEARNING FOR CYBERSECURITY APPLICATIONS

(71) Applicant: 4MindsAI Inc., Dallas, TX (US)

(72) Inventor: Kubashen Jerome Naidoo, Heath, TX (US)

(73) Assignee: 4MindsAI Inc., Dallas, TX (US)

( * ) Notice: Subject to any disclaimer, the term of this patent is extended or adjusted under 35 U.S.C. 154(b) by 0 days.

(21) Appl. No.: 19/014,047

(22) Filed: Jan. 8, 2025

Related U.S. Application Data

(60) Provisional application No. 63/724,030, filed on Nov. 22, 2024.

(51) Int. Cl.
| | |
|---|---|
| *H04L 29/06* | (2006.01) |
| *G06F 21/32* | (2013.01) |
| *G06F 21/56* | (2013.01) |
| *G06F 21/57* | (2013.01) |

(52) U.S. Cl.
CPC .............. *G06F 21/56* (2013.01); *G06F 21/32* (2013.01); *G06F 21/57* (2013.01)

(58) Field of Classification Search
CPC ........... G06F 21/56; G06F 21/32; G06F 21/57
See application file for complete search history.

(56) References Cited

U.S. PATENT DOCUMENTS

| | | | |
|---|---|---|---|
| 11,238,849 B1 * | 2/2022 | Mimassi | ................. G10L 15/16 |
| 11,915,111 B2 | 2/2024 | Delisle et al. | |

| | | | |
|---|---|---|---|
| 2018/0032915 A1 * | 2/2018 | Nagaraju | ............. G06V 10/776 |
| 2019/0341025 A1 * | 11/2019 | Omote | .................... G10L 25/30 |
| 2019/0349356 A1 | 11/2019 | McElwee et al. | |
| 2021/0117780 A1 * | 4/2021 | Malik | ....................... G06F 9/547 |
| 2021/0326757 A1 * | 10/2021 | Rawat | .................... G06N 3/045 |
| 2022/0224683 A1 * | 7/2022 | Solano Gomez | ... H04L 63/0861 |
| 2022/0374762 A1 * | 11/2022 | Radhakrishnan | ...... G06N 20/00 |
| 2022/0374763 A1 | 11/2022 | Gu et al. | |
| 2022/0383197 A1 * | 12/2022 | Park | .................... G06F 21/6218 |
| 2023/0068386 A1 * | 3/2023 | Akdeniz | ................ G06N 3/084 |
| 2023/0101741 A1 * | 3/2023 | Yoo | ........................ G16H 50/30 |
| | | | 706/10 |

(Continued)

FOREIGN PATENT DOCUMENTS

| | | | |
|---|---|---|---|
| AU | 2021104400 A4 | 9/2021 | |
| WO | WO 2023215972 A1 | 11/2023 | |
| WO | WO 2024145209 A1 | 7/2024 | |

*Primary Examiner* — William A Corum, Jr.
(74) *Attorney, Agent, or Firm* — Fish & Richardson P.C.

(57) ABSTRACT

A multi-agent system implementing federated learning for cybersecurity applications. The system includes one or more processing devices that perform operations including receiving, from each node of multiple nodes of the distributed system, a plurality of parameters representative of model updates to a corresponding machine-learning model. The corresponding machine learning model is trained to detect cybersecurity threats within a context of the corresponding node. Based on the parameters received from the multiple nodes, a set of global model parameters that represents global updates to the individual machine-learning models. The global model parameters are transmitted to at least a subset of the multiple nodes of the distributed system, and the global model parameters are configured to update local model parameters of the corresponding machine learning model at each node.

20 Claims, 12 Drawing Sheets

(56)     References Cited

U.S. PATENT DOCUMENTS

| | | | |
|---|---|---|---|
| 2023/0153633 A1* | 5/2023 | Mohalik | G06N 20/00 |
| | | | 706/25 |
| 2023/0237326 A1* | 7/2023 | Wu | G06N 3/08 |
| | | | 706/21 |
| 2023/0281462 A1* | 9/2023 | Wu | G06N 3/098 |
| | | | 706/25 |
| 2023/0370491 A1 | 11/2023 | Crabtree et al. | |
| 2024/0289634 A1* | 8/2024 | Bangalore Lakshman | |
| | | | G06N 20/00 |
| 2024/0291869 A1 | 8/2024 | Crabtree et al. | |
| 2025/0005149 A1 | 1/2025 | Nandi et al. | |
| 2025/0061195 A1 | 2/2025 | Salman | |
| 2025/0068928 A1* | 2/2025 | Mckelvey | H04L 9/50 |

* cited by examiner

100

200

250

300

700

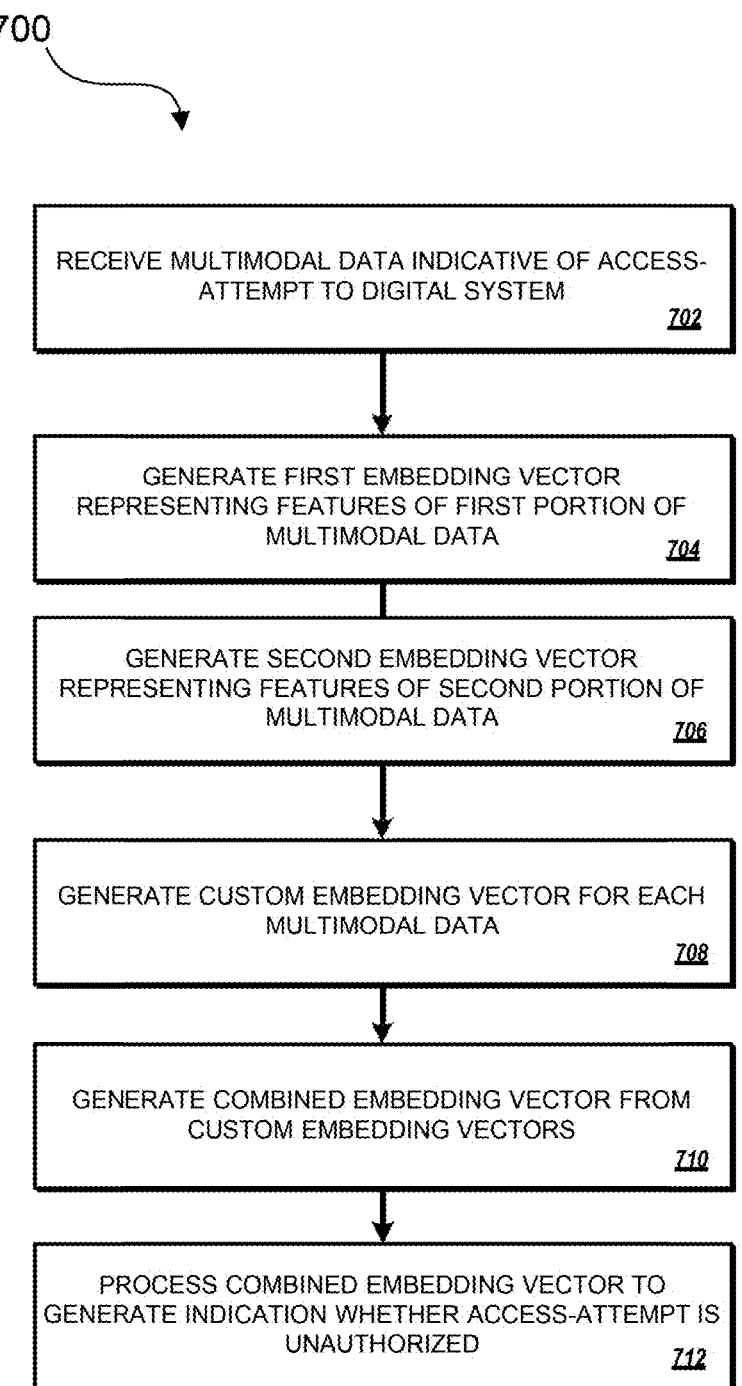

RECEIVE MULTIMODAL DATA INDICATIVE OF ACCESS-ATTEMPT TO DIGITAL SYSTEM
702

GENERATE FIRST EMBEDDING VECTOR REPRESENTING FEATURES OF FIRST PORTION OF MULTIMODAL DATA
704

GENERATE SECOND EMBEDDING VECTOR REPRESENTING FEATURES OF SECOND PORTION OF MULTIMODAL DATA
706

GENERATE CUSTOM EMBEDDING VECTOR FOR EACH MULTIMODAL DATA
708

GENERATE COMBINED EMBEDDING VECTOR FROM CUSTOM EMBEDDING VECTORS
710

PROCESS COMBINED EMBEDDING VECTOR TO GENERATE INDICATION WHETHER ACCESS-ATTEMPT IS UNAUTHORIZED
712

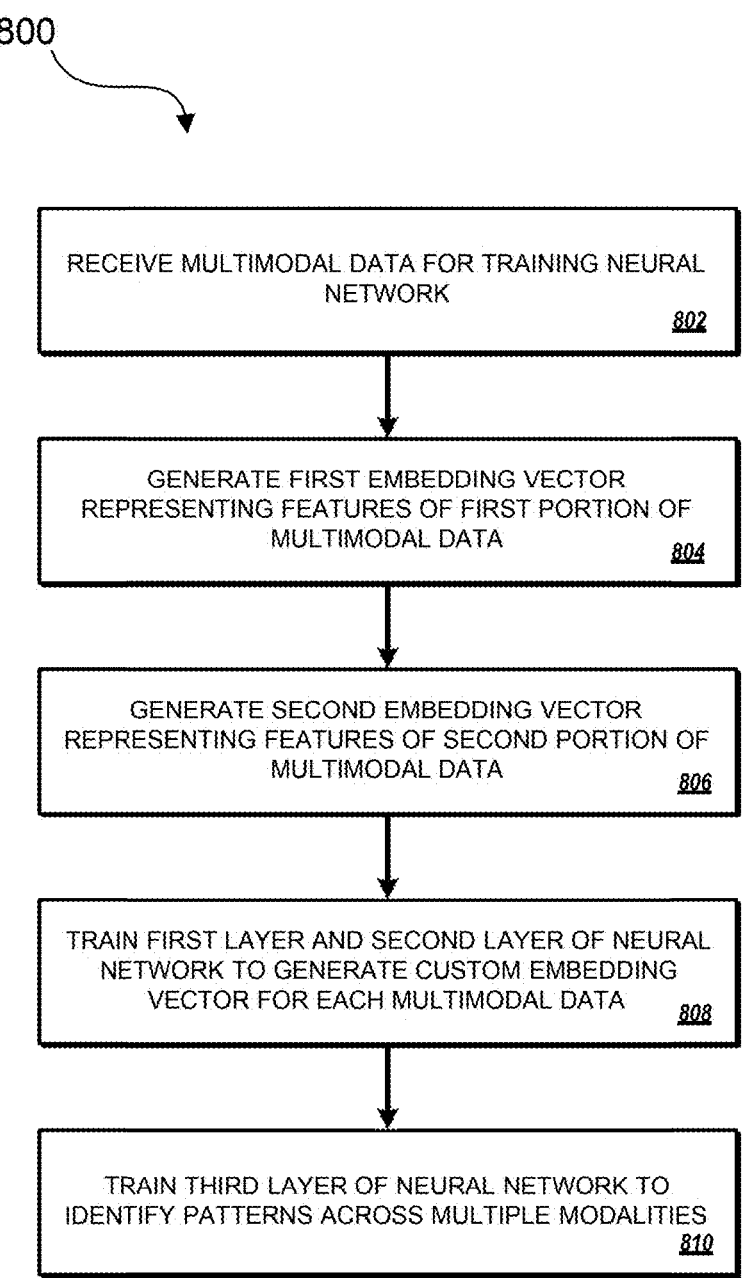

RECEIVE MULTIMODAL DATA FOR TRAINING NEURAL NETWORK _802_

GENERATE FIRST EMBEDDING VECTOR REPRESENTING FEATURES OF FIRST PORTION OF MULTIMODAL DATA _804_

GENERATE SECOND EMBEDDING VECTOR REPRESENTING FEATURES OF SECOND PORTION OF MULTIMODAL DATA _806_

TRAIN FIRST LAYER AND SECOND LAYER OF NEURAL NETWORK TO GENERATE CUSTOM EMBEDDING VECTOR FOR EACH MULTIMODAL DATA _808_

TRAIN THIRD LAYER OF NEURAL NETWORK TO IDENTIFY PATTERNS ACROSS MULTIPLE MODALITIES _810_

RECEIVE MULTIMODAL DATA REPRESENTING ACCESS
ATTEMPT TO DIGITAL SYSTEM
*902*

PROVIDE MULTIMODAL DATA TO NEURAL NETWORK
*904*

RECEIVE FROM NEURAL NETWORK INDICATION THAT
ACCESS ATTEMPT IS UNAUTHORIZED
*906*

ACCESS MODEL TRAINED TO GENERATE
CORRESPONDING MITIGATION STRATEGY
*908*

GENERATE SIGNALS CONFIGURED TO IMPLEMENT AT
LEAST A PORTION OF MITIGATION STRATEGY
*910*

1000

RECEIVE PLURALITY OF PARAMETERS REPRESENTATIVE OF MODEL UPDATES TO MACHINE LEARNING MODEL     *1002*

GENERATE SET OF GLOBAL MODEL PARAMETERS     *1004*

TRANSMIT GLOBAL MODEL PARAMETERS TO SUBSET OF MULTIPLE NODES OF DISTRIBUTED SYSTEM     *1006*

MULTI-AGENT SYSTEM IMPLEMENTING FEDERATED LEARNING FOR CYBERSECURITY APPLICATIONS

CROSS-REFERENCE TO RELATED APPLICATION

This application claims the benefit under 35 U.S.C. § 119(e) of the filing date of U.S. Patent Application No. 63/724,030, filed on Nov. 22, 2024, the entire content of which is incorporated herein by reference.

TECHNICAL FIELD

This specification relates to detecting and mitigating multimodal cybersecurity threats.

BACKGROUND

Cybersecurity involves protecting systems, networks, and data from digital threats. It includes implementing defenses against malware, phishing, and hacking. Effective cybersecurity ensures the confidentiality, integrity, and availability of sensitive information. As cyber threats grow more sophisticated, robust cybersecurity measures are increasingly important to mitigate risks and enhance digital safety.

SUMMARY

This specification describes technologies for detecting and analyzing multi-modal cybersecurity threats. These technologies generally involve receiving input data indicative of an attempt to access a system or device that includes multiple modalities of data. Each modality of data included in the input data is processed by a modality-specific layer. This generates an embedding vector for each modality that represents the modality in a shared vector space. Once the different modalities of data have been thus projected into a shared vector space, they can be fused through generation of a weighted combination of the embedding vectors. The weights in the weighted combination can be selected intelligently using a model and based on criteria related to the access-attempt to the system or device.

The technologies also involve training the models used to generate the embedding vectors using custom loss functions. The custom loss functions include weighted combinations of multiple loss functions, where the weights can be intelligently selected by an agent. For example, a custom loss function can be a weighted combination of contrastive loss and triplet loss.

The technologies also involve incorporating federated learning techniques across a system of local nodes including local copies of the models used to detect cybersecurity threats. The federated learning techniques are enhanced through integration with a Multi-Agent System (MAS) framework that enables real-time updates to be made to models in addition to the updates made as part of the federated learning cycle. A plurality of agents can receive real-time data and make updates to subsets of parameters of local copies of models based on the real-time data. These updates can be specific to local copies of the models, and can incorporate data relevant to the local copies.

The technologies also involve using a combination of reinforcement learning (RL) and decision trees to train a model to generate risk mitigation strategies for how to respond to potential cybersecurity threats to the system or device. A model uses a decision tree to classify a potential cybersecurity threat, or to determine a response to a potential cybersecurity threat. The model is trained using RL, where the rewards generated as part of the RL process are based on historical data related to previous responses to potential cybersecurity threats and their effectiveness. Both the decision tree and the RL process are based on a query matrix algorithm that characterizes the similarity of the potential cybersecurity threat to known threats, according to multiple criteria. Both the decision tree and the RL process are also based on a database including data related to known threats, historical data of the effectiveness of previous responses, and data related to defined security policies. For example, the defined security policies can be set by a user of the system or device, based on legal regulations, or both.

In general, one innovative aspect of the subject matter described in this specification can be embodied in methods that include the actions of receiving, from each node of multiple nodes of the distributed system, a plurality of parameters representative of model updates to a corresponding machine-learning model that is trained at the corresponding node of the distributed system, the corresponding machine learning model trained to detect cybersecurity threats within a context of the corresponding node; generating, based on the parameters received from the multiple nodes, a set of global model parameters that represents global updates to the individual machine-learning models trained at the multiple nodes of the distributed system; and transmitting to at least a subset of the multiple nodes of the distributed system, the global model parameters, wherein the global model parameters are configured to update local model parameters of the corresponding machine learning model at each node of the subset of multiple nodes. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, in one embodiment, the corresponding machine-learning model on a node of the multiple nodes of the distributed method is trained to detect the cybersecurity threats based on multi-modal data that includes data of a first modality and at least a second modality different from the first modality. In some embodiments, each of the first modality and the second modality comprises one of: text, images, behavioral data, or biometrics data.

In one embodiment, generating the global model parameters includes combining the model updates from individual nodes in a weighted combination. In some embodiments, a weight for a particular model update in the weighted combination is determined based on a characteristic of data used in training the machine learning model at the corresponding node.

In one embodiment, data used in training the corresponding machine-learning model at the corresponding node of the distributed method is secured within a trusted execution environment (TEE) at the corresponding node.

In one embodiment, the plurality of parameters representative of the model updates includes one of: derivatives of one or more loss functions associated with the model parameters and a subset of all model updates for the corresponding machine-learning model.

The technology described in this specification can be implemented so as to realize one or more of the following advantages.

First, the multimodal fusion techniques disclosed herein allow for the detection and analysis of cybersecurity threats based on multiple modalities of data. Typically, it can be difficult to process data of different formats. For this reason, many traditional cybersecurity systems are unable to incorporate data of different modalities into threat detection and analysis, instead relying only on a single modality of data. Relying only on a single modality of data can reduce the effectiveness with which a cybersecurity system detects and analyzes potential cybersecurity threats. By contrast, techniques described herein to fuse multiple modalities of data into a unified format for effective processing helps to incorporate multiple modalities of data into threat detection and analysis, thereby enabling more accurate and effective detection and analysis of potential cybersecurity threats.

Second, incorporating multiple loss functions into a custom loss function that is used to train the model can be advantageous by giving the custom loss function beneficial features of each of the losses incorporated into it. For example, the combination of both contrastive and triplet loss is advantageous, as opposed to using either one in isolation. The utilization of triplet loss can help with the reduction of false positive in anomaly detection, whereas the utilization of contrastive loss can help with the identification of differences between embeddings with low variation, such as embeddings representing biometric data.

Third, the federated learning techniques described herein allow for quick local learning without the risk of data leakage. The data received by each local node indicative of a potential cybersecurity threat can be sensitive and/or include private information about a user of the system or device experiencing the potential threat. The federated learning techniques described herein help to better assure that sensitive, user-specific information remains on the local nodes without being communicated to a central aggregation node. This can be beneficial because the communication of the sensitive, user-specific information can risk the leakage of the information.

Additional advantages provided by the federated learning techniques include the fact that local updates can be carried out at the local nodes, providing quick local learning. The latency is reduced by having small local updates aggregated by a central aggregation node instead of having a large batch update. Thus, the federated learning techniques described herein can provide both the security benefits of privacy-preserving gradient exchange and the speed and flexibility of distributed learning.

Fourth, the foundation of historical data and known threats in combination with the query matrix algorithm used in the RL process and decision trees of the risk mitigation strategy generation described herein allows for the generation of more intelligent risk mitigation strategies. The query matrix algorithm is used to indicate the similarity of a potential cybersecurity threat to known threats, along a number of dimensions (each dimension corresponding to a different criterion of similarity). Thus, the model can base its risk mitigation strategy generation on the extent to which a potential threat is similar to a known threat. For example, the model can generate strategies involving escalated responses to potential threats that resemble known threats. As another example, the model can generate strategies in response to known threats that are similar to other strategies that have historically been effective.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a flow diagram of an example process for detecting cybersecurity threats.

FIG. 8 is a flow diagram of an example process for training a neural network for detecting cybersecurity threats to a digital system.

Like reference numbers and designations in the various drawings indicate like elements.

DETAILED DESCRIPTION

With the advent of pervasive digital systems, cyber threats have become more frequent, complex, and sophisticated. Cybersecurity technologies often focus on individual modalities, such as text-based logs or network traffic, and fail to address the wide range of inputs that may be used in modern cyber-attacks-including, for example, images, behavioral patterns, and biometric data. Such cybersecurity technologies often offer a superficial understanding of threats, making them inadequate for detecting and mitigating sophisticated, multi-modal threats. Moreover, centralized data analysis systems pose significant privacy risks, making them less suitable for highly regulated industries.

The technology described herein provides for a cybersecurity platform that incorporates advanced multimodal data fusion for contextual risk assessment and offers artificial intelligence (AI)-driven, real-time risk mitigation recommendations. The technology described herein uses privacy-preserving federated learning to ensure that raw/sensitive data that may be used to train a particular system within a network is not transmitted outside the particular system. The platform also includes adaptive policy management with a Multi-Agent System (MAS) that learns from and adapts to—on an ongoing basis—new regulatory requirements. Furthermore, the platform can be configured to use secure hardware-based data processing to enhance security during computation and provide robust data leak protection measures.

Figure 1:
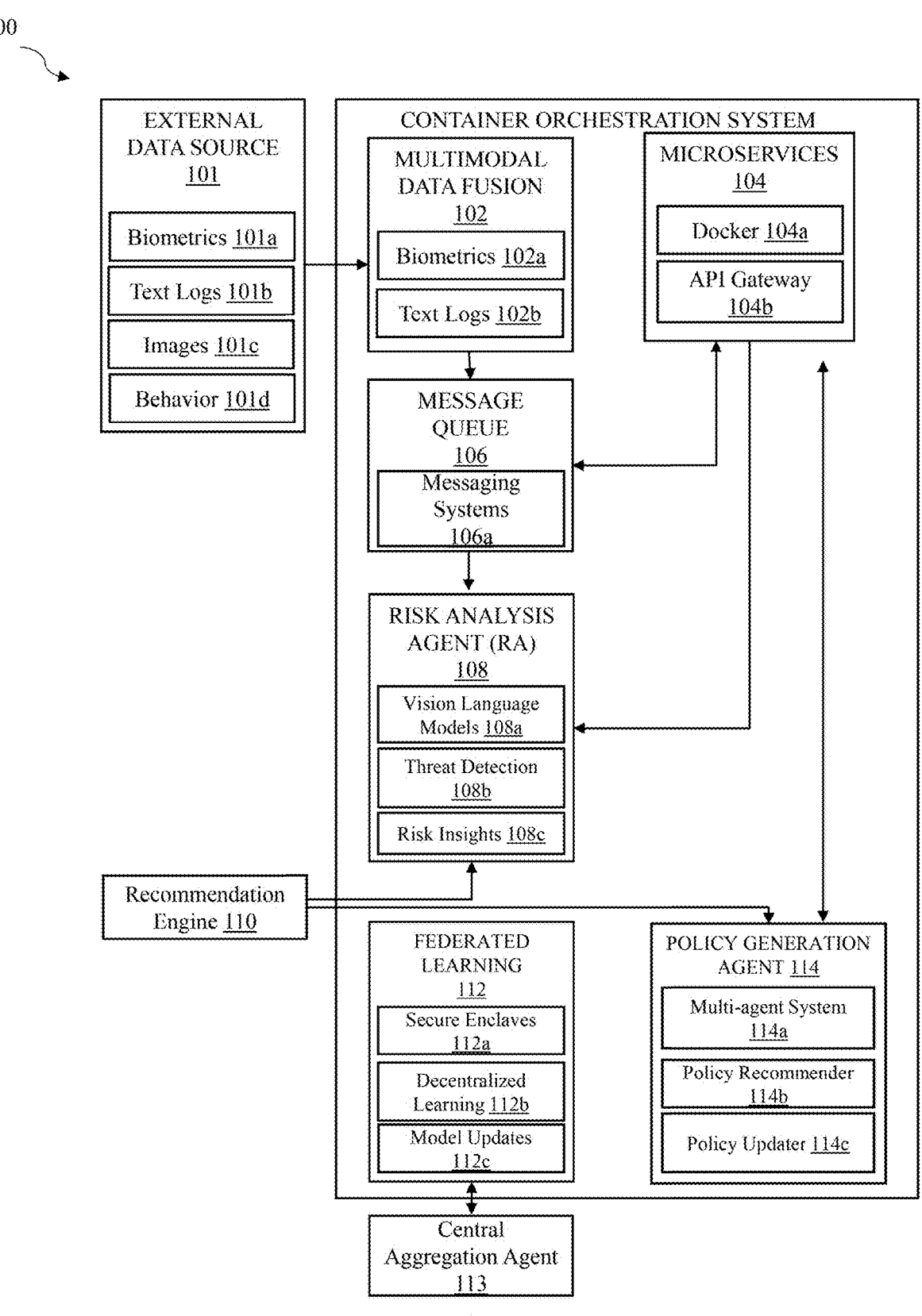
FIG. 1 is an example threat detection system.

FIG. 1 is an example of a threat detection system 100 implemented in accordance with technology described herein. The threat detection system 100 can be used in conjunction with a system or a device 115 that is vulnerable to potential cybersecurity threats. The threat detection system 100 can be configured to detect, monitor, and/or analyze potential cybersecurity threats to the system or device 115.

In some implementations, the threat detection system 100 can include a plurality of modules that execute on a distributed system. For example, the modules of the threat detection system 100 can be configured to execute on a cloud-based platform (e.g., a Kubernetes platform) configured to automate deployment, scaling, and management of containerized applications. In some implementations, such a platform can be configured to organize clusters of virtual machines (VMs) and schedule containers to run on the VMs based on available resources and container needs. The technology described herein may be deployed on other distributed or non-distributed computing systems. For example, the technology described herein may be deployed on various combinations of cloud and edge computing systems, or on computing devices such as a server.

For the purposes of the description herein, a module refers to a subsystem of the threat detection system 100 that implements a particular feature or functionality of the threat detection system 100. A module can include software and/or hardware components, networks, and/or interconnections between multiple components and networks. In some implementations, different modules can include the same components, networks, and/or interconnections, but the components, networks, and/or interconnections included in different modules may be used for different purposes in the different modules.

In some implementations, the threat detection system 100 includes a multimodal data fusion module 102, a microservices module 104, a message queue module 106, a risk analysis (RA) agent 108, a recommendation engine 110, a federated learning module 112, and a policy generation agent 114.

The threat detection system 100 receives data from an external data source 101. The data can be indicative of a potential cybersecurity threat to the system or device 115. The external data can be related to one or more events that occur on the system or device 115. For example, the one or more events can include attempts to log in to the system or device 115, messages sent to or from the system or device 115, information being entered into the system or device 115, or a combination of these. The external data provided by the external data source 101 can be analyzed by a portion of the system 100 to detect a potential cybersecurity threat to the system or device 115. For example, using technology described herein, the external data can be analyzed to detect multiple failed login attempts to the system or device 115, phishing emails or other suspicious messages sent to the system or device 115, or information being entered into the system or device 115 from an unusual location or in an unusual manner.

The external data received by the threat detection system 100 can be of various modalities. For example, the external data can include multiple modalities of data such as biometric data (e.g., facial data) 101a, data related to text logs 101b, images 101c, data related to behavior of a user of the system or device 115 (e.g., typing speed or location data) 101d, data related to network traffic to and from the system or device 115, or any combination of these.

The multimodal data fusion module 102 is configured to receive the external data received by the threat detection system 100 and generate representations that combine information from the multiple modalities. In particular, different modalities of data typically have different formats which can make it difficult for a threat detection system to identify relationships between the different modalities of data that can be relevant in detecting potential cybersecurity threats. Thus, the multimodal fusion module 102 generates a plurality of embedding vectors, where each embedding vector represents a different modality of data included in the external data. The multimodal fusion module 102 projects each of the plurality of embedding vectors into a shared embedding space such that the threat detection system 100 can identify relationships between the different modalities of data using the projected embedding vectors. This improves the ability of the threat detection system 100 to accurately detect potential cybersecurity threats by enabling it to identify relationships between different modalities of data that may be relevant to threat detection.

Relying only on a single modality of data can reduce the effectiveness with which a cybersecurity system detects and analyzes potential cybersecurity threats, which have become increasingly multi-modal in recent times. The ability of the multimodal data fusion module 102 to fuse multiple modalities of data into a unified format can enable more accurate and effective detection and analysis of potential cybersecurity threats, as compared to systems that rely on individual modalities. The techniques by which the multimodal data fusion module 102 fuses multiple modalities of data are described in further detail below with reference to the series of layers 250 of FIG. 2A.

In some implementations, the system 100 includes a microservices module 104, which is configured to support one or more microservices configured to handle particular functions. For example, the one or more microservices can be configured to handle functions such as generating a risk score that characterizes a potential cybersecurity threat, generating risk mitigation recommendations in response to a detected cybersecurity threat, and generating security policies for the system or device 115 based on a detected cybersecurity threat. In a Kubernetes system, the microservices module 104 can represent an application architecture where standalone services interact with each other over an application programming interface (API) gateway 104b to provide the particular functions. In some implementations, each of the one or more microservices can run within a separate container 104a. In some implementations, multiple microservices may run on a particular container 104a.

The output from each microservice can be utilized to perform tasks within the threat detection system 100. Different microservices' outputs can be used for various types of operations or for operations with distinct purposes within the threat detection system 100. In some implementations, the output generated by one microservice may be used to determine a risk score for a potential cybersecurity threat indicated in the external data received by the threat detection system 100. In some implementations, the output generated by a microservice may be used to update parameters of a model within the threat detection system 100. In some implementations, the output generated by a microservice may be used enforce security policies dictating access to data in the threat detection system 100. In some implementations, one or more of the outputs generated by the one or more microservices can be viewable by users of the threat detection system 100. In some implementations, one or more of the outputs generated by the one or more microservices can be communicated to other microservices and/or components of the threat detection system 100.

The message queue 106 includes one or more messaging systems 106*a* that can be configured to facilitate communications (e.g., low-latency communications that do not create congestion/bottlenecks in communications among agents) between various components of the threat detection system 100. In some implementations, any communication between components of the threat detection system 100 can be configured to pass through one or more messaging systems 106*a* of the message queue 106. The one or more messaging systems 106*a* can include, for example, Apache Kafka® and NATS. The function of the one or more messaging systems 106*a* in the message queue 106 is described in further detail below with reference to the message bus 418 of FIG. 4.

In some implementations, the system 100 includes an RA agent 108 that receives input based on the external data. For example, the RA agent 108 can receive as input, the output of one or more of the multimodal data fusion module 102 or the microservices module 104. In some implementations, the outputs of the data fusion module 102 and/or the microservices module 104 can be routed as events or messages through the message queue 106.

The RA agent 108 can be configured to use the received input to generate one or more outputs indicative of a potential cybersecurity threat to the system or device 115 in conjunction with which the threat detection system 100 is used. The RA agent 108 can generate the one or more outputs by processing the received input using a large language model (LLM) 108*a* such as the NVIDIA Vision Language Model (NVLM). The one or more outputs of the RA agent 108 can include, for example, threat detection 108*b*, risk insights 108*c*, mitigation strategies, recommended actions, and/or updates to security policies of the system or device 115. In some implementations, the RA agent 108 includes one or more of the multimodal data fusion module 102, the recommendation engine 110, and the policy generation agent 114. The RA agent 108 is described in further detail below with reference to FIG. 2A.

The recommendation engine 110 receives input from the RA agent 108 and generates output based on processing the received input. The output generated by the recommendation engine 110 can include recommendations for actions to address or mitigate a potential cybersecurity threat to the device or system in conjunction with which the threat detection system 100 is used. The output generated by the recommendation engine 110 can be communicated to other components of the threat detection system 100, such as the policy generation agent 114. The recommendation engine 110 is described in further detail below with reference to the recommendation engine 110 FIG. 2A.

The federated learning module 112 implements federated learning techniques within the threat detection system 100. For example, the federated learning module 112 allows the threat detection system 100 to utilize data from a plurality of decentralized local nodes without compromising the privacy of the data. In some implementations, the federated learning module 112 includes a central aggregation agent 113 that aggregates information from the plurality of decentralized local nodes. In particular, the central aggregation agent 113 aggregates model updates 112*c* received from the plurality of decentralized local nodes. This allows the federated learning module 112 to facilitate decentralized learning 112*b* within the threat detection system 100 without compromising data privacy that may be precipitated by transmitting raw data. The federated learning module 112 can utilize secure enclaves 112*a* to enhance security of the data from each of the plurality of decentralized local nodes. For example, each of the plurality of decentralized local nodes can be housed in a secure enclave 112*a*. In some implementations, the federated learning module 112 can be integrated with a Multi-Agent System (MAS) framework. In such implementations, a plurality of agents make additional model updates based on real-time information related to the security of the system or device 115 in conjunction with which the threat detection system 100 is being used. Thus, the federated learning module 112 is able to implement federated learning techniques in the threat detection system 100 while still generating real-time responses to incoming data. The federated learning module 112 is described in further detail below with reference to FIG. 3.

The policy generation agent 114 receives input based on the external data received by the threat detection system 100. In some implementations, the policy generation agent 114 includes a multi-agent system 114*a*, a policy recommender 114*b*, and a policy updater 114*c*. Upon processing the received input, the policy generation agent 114 generates one or more outputs related to security policies employed by the system or device 115 in conjunction with which the threat detection system 100 is used. For example, the policy generation agent 114 can generate recommended security policies and/or updates to existing security policies that reflect the potential cybersecurity threat indicated in the received data. The policy generation agent 114 can be one of the plurality of agents in the MAS framework with which the federated learning module 112 is integrated, as described above. The policy generation agent 114 is described in further detail below with reference to recommendation engine 110 of FIG. 2A.

In the example of FIG. 1, the multimodal data fusion module 102, the microservices module 104, the risk analysis agent 108, the recommendation engine 110, the federated learning module 112, and the policy generation agent 114 are illustrated as separate modules. However, in some implementations, one or more of these modules can be combined. For example, one or more of the modules can be implemented as microservices within the microservices module 104. As another example, in some implementations, the multimodal data fusion module 102 can be included in the risk analysis agent 108, as described below with reference to FIG. 2A. Operations of these modules are described in further detail with reference to the additional figures below.

In the example of FIG. 1, the operations of the multimodal data fusion module 102, the microservices module 104, the message queue 106, the RA agent 108, the federated learning module 112, and the policy generation agent 114 are orchestrated by a container orchestration system. In some implementations, the contained orchestration system is Kubernetes. This can be advantageous because a container orchestration system can support automatic scaling based on event triggers, enabling the system to dynamically adjust the number of active agents or microservices without downtime. The scaling is both based on resource utilization and is also task-aware. For example, detecting an increase in phishing attacks can trigger the scaling up of agents or microservices related to threat detection, while leaving other agents or microservices unchanged. Given the high stakes in cybersecurity, this can be beneficial because it allows for dynamic adaptation to events. Additionally, the architecture handles fault tolerance and better assures that, if an agent or microservice fails, the corresponding data continues to be securely managed.

Figure 2A:
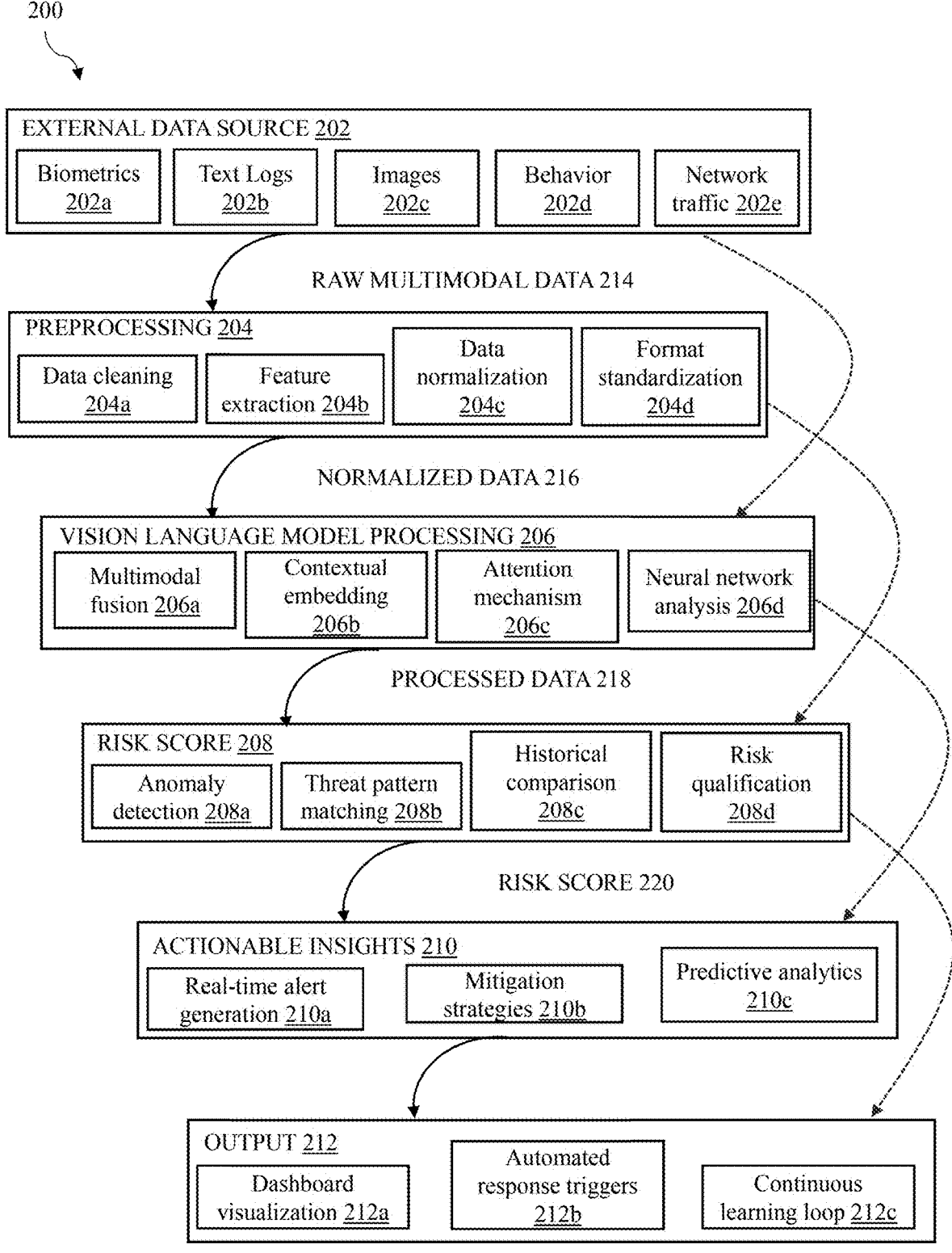
FIG. 2A is an example risk analysis agent.

FIG. 2A is the RA agent 108. The RA agent 108 can be configured to generate analyses of potential cybersecurity threats-potentially in cooperation with one or more other modules described above with reference to FIG. 1. In some implementations, the RA agent 108 includes a preprocessing module 204, the multimodal data fusion module 102, a risk score module 208, the recommendation engine 110, and an output module 212.

In some implementations, the RA agent 108 includes a preprocessing module 204 configured to preprocess raw multimodal data 214 for subsequent analysis by applying one or more preprocessing techniques to the raw multimodal data 214 to generate normalized data 216, which is then processed. The preprocessing module 204 can generate the normalized data 216 by converting the raw multimodal data 214 to a format that is compatible with a vision language model included in the multimodal data fusion module 102. The vision language model included in the multimodal data fusion module 102 can be any suitable vision language processing module, such as a NVLM. The one or more preprocessing techniques can include one or more of data cleaning 204a, feature extraction 204b, data normalization 204c, and format standardization 204d.

In some implementations, the multimodal data fusion module 102 can be configured to process the normalized data 216 using one or more models such as neural networks.

The multimodal data fusion module 102 can process the normalized data 216 using one or more of multimodal data fusion techniques 206a, contextual embedding techniques 206b, attention mechanism techniques 206c, or neural network analysis techniques 206d. In some implementations, the techniques used by the multimodal data fusion module 102 can include encoding techniques that are specific to the modality of the data received. For example, if the received data includes data of multiple modalities (also referred to herein as multi-modal data), the multimodal data fusion module 102 can be configured to apply a respective modality-specific encoding technique to each modality within the multi-modal data. One example of processing multi-modal data using multiple modality-specific layers in a neural network is illustrated in FIG. 2B.

Figure 2B:
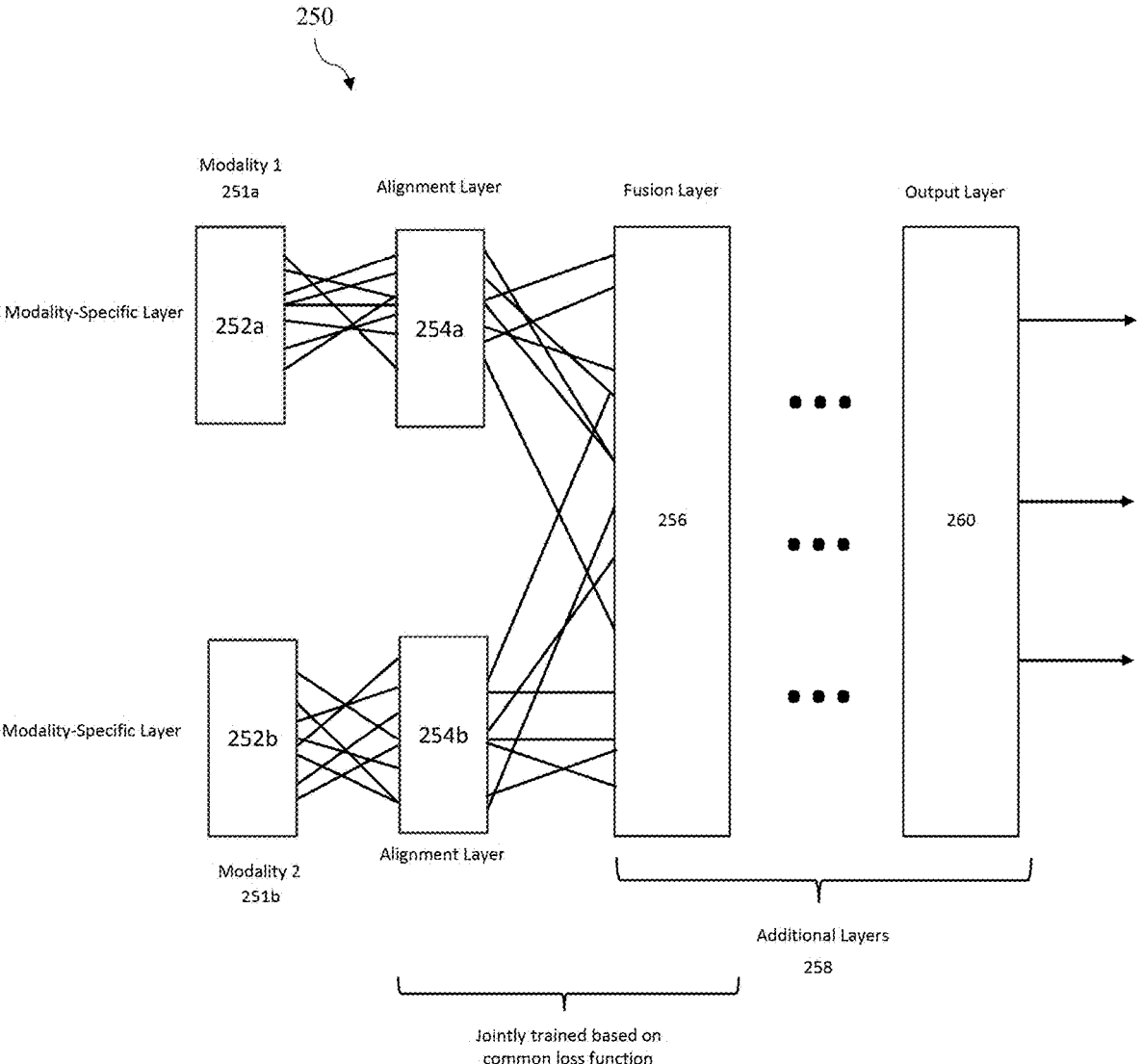
FIG. 2B is an example series of layers of one or more neural networks that perform data processing techniques performed by a risk analysis agent of a threat detection system.

Specifically, FIG. 2B is an example series of layers 250 of a neural network that performs the techniques performed by the multimodal data fusion module 102 to process the normalized data 216. The series of layers 250 includes modality-specific layers 252a and 252b, modality alignment layers 254a and 254b, and at least one multimodal fusion layer 256. In some implementations, the series of layers 250 additional includes additional layers 258 and an output layer 260. The series of layers 250 receives data from an external source for processing. The received data can indicate a potential cybersecurity threat to a digital system. The received data can include a plurality of modalities of data. In some implementations, the received data can be the raw multimodal data 214 or the normalized data 216 as described above with reference to FIG. 2A. For simplicity, in the example of FIG. 2B, the series of layers 250 processes data of two modalities of data (e.g., modality 251a and modality 251b, 251 in general). However, this disclosure is not limited in this respect, and the series of layers 250 can process data of any suitable number of modalities.

In some implementations, each modality of data 251 can be processed using a modality-specific layer 252. In the example of FIG. 2B with two modalities of data, modality 251a is processed using modality-specific layer 252a, and modality 251b is processed using modality-specific layer 252b. In some implementations, each modality-specific layer (252a or 252b, 252 in general) applies the respective data encoding techniques that are specific to the modality of the data 251 being processed. In some implementations, each modality-specific layer 252 has features that correspond to the modality of data 251 being processed by the modality-specific layer 252.

In some implementations, the encoding techniques applied to each modality of data can be configured to generate one or more embedding vectors that represent features of the corresponding modality of data having any suitable number of dimensions. In some implementations, the number of dimensions can correspond to relevant features of the corresponding modality of data.

These modality-specific encoding techniques can be advantageous because different types of embedding vectors may be more or less suited for representing different modalities of data due to the different features of the various modalities of data. For example, different types of embedding vectors may have different attributes and/or be located in different vector spaces that are more or less suited for representing the particular features of a given modality of data. Thus, representing each modality of data using a type of embedding vector well suited for representing the modality can help to optimize how features and characteristics of the multi-modal data are captured and represented by the embedding vectors. This can enhance the overall effectiveness of a threat detection system.

As an example, the encoding techniques applied to data that include text logs can include processing the text logs using layers of a transformer neural network, such as a transformer NVIDIA neural network, that encodes textual data into dense embeddings that capture semantic meaning and context. The processing of the text logs by the layers of the transformer neural network can include tokenization of the text, and conversion of the tokenized text into dense vectors using a transformer. The parameters of the layers of the transformer neural network can include various tokenization strategies, sequence length for context preservation, and pretraining tasks such as masked language modeling. In some implementations, the use of transformers can allow for capturing sequential dependencies and long-range relationships in text data, which in turn can be of interest for understanding semantic context and structure of textual data.

As another example, the encoding techniques applied to images can include processing the images using a convolutional neural network (CNN) to extract spatial and structural features and embedding these features into a vector representation that preserves relevant visual information. The parameters of the CNN can be kernel size and number of filters to capture fine and coarse details, and pooling strategies to reduce dimensionality while retaining features of interest. This can be advantageous because images contain spatial features, such as edges, patterns and textures, which CNNs efficiently capture using convolutional filters. Similarly, CNNs can also be used for certain image-based biometric data such as fingerprints to generate separate, potentially unique, embeddings for different patterns included in the biometric data.

For modalities that are represented as time-series data, layers of recurrent neural networks (RNNs) may represent an effective encoding technique, in some implementations. For example, certain behavioral data (e.g., speed/rate of typing or interacting with an input device, time taken for a log-in or other access attempts, etc.) that can be represented as time-series data can be encoded using layers of a RNN to capture temporal sequences representing features of interest in such time-series data. The parameters of the layers of the RNN can include, for example, sequence length to capture temporal patterns and memory state retention. Layers of RNNs can thus be used to model dependencies over time for data of certain modalities including behavioral data that can be represented as time-series data.

In some implementations, the embedding vector generated by each modality-specific layer is processed by an alignment layer 254 corresponding to the modality-specific layer. In the example of FIG. 2B, the embedding vector generated by modality-specific layer 252a is processed by alignment layer 254a, and the embedding vector generated by modality-specific layer 252b is processed by alignment layer 254b. In some implementations, the alignment layers 254 process each embedding vector to generate a respective custom embedding vector for the embedding vector. The custom embedding vectors can be uniform vector representations in a vector space. In particular, the embedding vectors generated by the modality-specific layers 252 based on different modalities of data can have different features. The processing of these embedding vectors by the alignment layers 254 can convert the embedding vectors with different features into a uniform format, such as a uniform vector representation in a vector space.

For example, if one modality is text, the features in an embedding vector generated by the corresponding modality-specific layer can include semantic context and syntactic structure that capture relationships between words and meanings in textual data. If the second modality includes images, the features in an embedding vector generated by the corresponding modality-specific layer can include spatial and structural patterns, such as edges, textures, and object arrangements to encodes pixel data into a vector representing the visual content. These embedding vectors, being modality-specific, exist in different feature spaces. In this example, the alignment layer can be configured to transform these modality-specific embeddings into a shared embedding space. For example, both the text and image embedding vectors in the shared embedding space can include a semantic correlation feature, enabling comparisons and determinations of correlations across modalities.

In some implementations, the alignment layers 254 generate the custom embedding vectors by projecting the embedding vectors generated for each modality into a shared embedding space. In some implementations, the alignment layers 254 generate the custom embedding vectors by transforming each embedding vector into a common dimensionality, typically using linear layers or projection layers. In some implementations, the alignment layers 254 are trained jointly to optimize (e.g., minimize) the distance between related data points from different modalities in the shared embedding space.

In some implementations, the alignment layers 254 are updated simultaneously with the multimodal fusion layer 256 (described below) during a training process. In some implementations, the alignment and fusion layers are trained in a shared optimization loop to minimize or otherwise optimize a common loss function. This in turn can tune the corresponding layers cooperatively such that embedding vectors are aligned into a shared space and the multi-modal data is fused together within the fusion layer 256 in an effective way.

The plurality of custom embedding vectors generated by the alignment layers 254 are processed by the multimodal fusion layer 256. The multimodal fusion layer 256 (potentially together with one or more additional layers 258) generates a combined embedding vector that is based on the plurality of custom embedding vectors. The combined embedding vector can be analyzed (e.g., by a separate layer of the neural network, or using a separate machine learning model) to determine whether or not the combined embedding vector represents a potential cybersecurity threat. For example, even though data of individual modalities of the raw multimodal data 214 may not indicate the presence of a cybersecurity threat, the combined embedding vector can characterize a potential cybersecurity threat by considering the data of different modalities together within a shared embedding space.

The combined embedding vector can be generated as a combination of the custom embedding vectors in various ways. In some implementations the combined embedding vector can be a linear combination (i.e., a weighted sum) of the custom embedding vectors. In some implementations, the weights can be determined by the multimodal fusion layer 256 (potentially in combination with the additional layers 258) of the neural network. In some implementations, the output layer 260 can be configured to output the weights.

The weights of the custom embedding vectors in the weighted sum that constitutes the combined embedding vector can be stored in one or more matrices. In some implementations, each modality of data can have a respective matrix of weights. In some implementations, each matrix of weights can have one or more dimensions. Each dimension of the matrix can represent measurements of a criterion related to the modality of data to which the matrix corresponds. In some implementations, each matrix of weights can have two dimensions, each of the two dimensions representing measurements of a different criterion related to the modality of data to which the matrix corresponds. In this way, two or more criteria can be associated with a given modality of data.

For example, if the modality of data to which a matrix corresponds is images, the two criteria can be a timestamp for the image, indicating a time at which the image was taken; and the resolution of the image. The matrix of weights corresponding to images can have two dimensions, with one dimension representing measurements of the timestamp of an image included in the raw multimodal data 214 and the second dimension representing measurements of the resolution of the image.

In some implementations, each column and each row of each matrix of weights can represent a measurement of the criterion associated with the column or row, respectively. In the example of the matrix corresponding to images, each row can represent a measurement of the timestamp of the image (e.g., the first row can represent a timestamp within one hour from a reference time point, the second row can represent a timestamp of any time between one and two hours prior to the reference time point, the third row can represent a timestamp of any time between two and three hours prior to the reference time point, etc.). In some implementations, the timestamp of an image can help determine its contextual relevance to the potential threat. In some implementations an image captured closer to the time of a detected event can be more relevant to an analysis for threat detection. Images captured further away in time from an event might have less direct relevance but could still contribute to understanding longer-term patterns or anomalies. Weighting based on timestamp can allow for the model to prioritize recent or temporally relevant data, which can be of interest for real-time threat detection.

In some implementations, each column can represent a measurement of the resolution of the image (e.g., the first column can represent a resolution within a defined highest possible range, the second column can represent a resolution within a range that is lower than the highest possible range by a defined amount, the third column can represent a resolution within a range that is lower than the range represented by the second column by a defined amount, etc.). As such, the rows of each matrix of weights can represent measurements of a first criterion associated with the modality of data to which the matrix corresponds; and the columns of each matrix of weights can represent measurements of a second criterion associated with the modality of data to which the matrix corresponds.

In some implementations, for each modality of data included in the received data, the multimodal fusion layer 256 can be configured to determine one or more criteria associated with the modality. For example, in implementations in which there are two criteria associated with each modality of data, the multimodal fusion layer 256 can determine each of the two criteria for each modality of data included in the received data. In some implementations, for each matrix of weights, the multimodal fusion layer 256 can measure the first criterion represented by the rows of the matrix and the second criterion represented by the columns of the matrix.

In some implementations, each entry of each matrix of weights can be a weight that is assigned to the custom embedding vector for modality of data corresponding to the matrix based on the measurements of the criteria associated with the modality of data made by the multimodal fusion layer 256. In some implementations, each entry can be the weight assigned to the custom embedding vector for the modality of data of which the first criterion is determined to be the measurement represented by the row of the entry, and of which the second criterion is determined to be the measurement represented by the column of the entry. Upon determining the two criteria associated with a modality of data included in the received data, the multimodal fusion layer 256 can select for the custom embedding vector for the modality of data the weight in the entry of the corresponding matrix that is located in the row that represents the determination of the first criterion of the modality of data and in the column that represents the determination of the second criterion of the modality of data.

In some implementations, the weights populating the matrices can be arranged so as to advantageously weight certain criteria more heavily than others. For example, in the example of matrix corresponding to images, the weights in subsequent rows of the matrix can be smaller than the weights in the preceding row. This is because, in the example described above, subsequent rows of the matrix represent earlier times. It can be beneficial to weight earlier times less than more recent times because data from earlier times can be less relevant to a potential impending threat than more recent data. In some implementations, the weights in subsequent columns of the matrix can be smaller than the weights in the corresponding preceding column. This is because, in the example described above, subsequent columns of the matrix lower resolutions. It can be beneficial to weight lower resolutions less than higher resolutions because images with lower resolutions can be less informative regarding a potential impending threat than images with higher resolutions.

In some implementations, the entries of each matrix of weights can be determined by training a model, such as a vision language model included in the series of layers 250. The vision language model included in the series of layers 250 can be any suitable vision language model, such as a NVLM. The model can be trained using training data that can include multimodal data such as the raw multimodal data 214 and metadata that characterizes the context in which the series of layers 250 is operating. The metadata can include, for example, the environment in which the series of layers 250 operates, the number of potential threats typically detected in the environment in which the series of layers 250 operates, or recent activity in the environment in which the series of layers 250 operates. Other examples include user-specific metadata, device type and operating system, MAC address or other unique device identifiers, user location during an access attempt, IP address or network segment from which the activity originates, etc.

In some implementations, the model can be trained using reinforcement learning (RL). For example, the model can randomly initialize weights to explore different combinations and evaluate their effectiveness. A number of training iterations can be performed. A training iteration can include using the model to generate a final embedding, generating a reward based on the final embedding, and adjusting the weights of the matrices based on the generated reward. The generated rewards can be based on the effectiveness of the use of the generated final embedding (in the manner to be described in further detail below) to detect a potential cybersecurity threat. In some implementations, the generated rewards can be based on the accuracy and precision with which a cybersecurity threat is detected using the generated final embedding. The generated rewards can also be based on instances in which the generated final embedding indicates a potential cybersecurity threat when no threat exists (i.e., false positives). For example, the generated rewards can include negative rewards that penalize false positives or computational inefficiencies.

As mentioned above, the alignment layers 254 (used to project embedding vectors of different modalities into a shared embedding space) and the multimodal fusion layer 256 (used to fuse the custom embedding vectors of the different modalities into a single combined embedding vector) are trained in a shared optimization loop to minimize or otherwise optimize a common loss function. In some implementations, the common loss function can be customized as a weighted combination of a plurality of loss functions. The plurality of loss functions can be selected, for example, based on characteristics of the modalities of data included in the data processed by the series of layers 250.

For example, the custom loss function can be a weighted combination of a contrastive loss function and a triplet loss function. The contrastive loss function is computed based on a distance between two custom embedding vectors of the custom embedding vectors generated by the alignment layers 254. For example, a contrastive loss function value can be determined for each pair of two custom embedding vectors based on the distance between the two custom embedding vectors in the pair. The model can be updated based on the values of the contrastive loss function in such a way that the distance between two custom embedding vectors in a pair where both custom embedding vectors represent data originating from the same user ("positive pairs") is minimized; while the distance between two custom embedding vectors in a pair where the custom embedding vectors represent data originating from different users ("negative pairs") is maximized.

In some implementations, the model can be updated based on the values of the contrastive loss function in such a way that the distance between two custom embedding vectors in a pair where the custom embedding vectors represent different modalities of data for a user is minimized or otherwise optimized. In some implementations, the model can be updated based on the values of the contrastive loss function in such a way that the distance between two custom embedding vectors in a pair where the custom embedding vectors represent behavioral and biometrics data of a user is minimized or otherwise optimized.

In some implementations, the distance between custom embedding vectors in a pair is represented using a similarity metric. The similarity metric can be cosine similarity, Euclidean distance, or any other suitable similarity metric that indicates a relationship between the custom embedding vectors in the pair.

In some implementations, a contrastive loss function can be used in the training of the model, for example, to orients the model to effective identification of specific users of the system or device. In some implementations, the use of contrastive loss can effectively provide the model with both positive and negative examples of a class (e.g., the positive and negative pairs). The training of a model with both positive and negative examples of a class can improve training at a high level.

In some implementations, a triplet loss function is computed based on a distance of two embeddings of the plurality of embeddings, from an anchor point of comparison. The anchor point can be, for example, an additional embedding of the plurality of embeddings or a defined point in the shared embedding space. A triplet loss function value can be determined for each pair of two custom embedding vectors based on the distance between the two custom embedding vectors in the pair and the distance of the two custom embedding vectors in the pair from the anchor point. The model can be updated based on the values of the triplet loss function in such a way that custom embedding vectors representing data originating from the same users are located near each other in the shared embedding space, while custom embedding vectors representing data originating from different users are not located near each other in the shared embedding space.

In some implementations, incorporation of a triplet loss function into the training of the model allows for increased variation as compared to using a contrastive loss function alone. Additionally, a triplet loss function can be used to orient the model to more generalizable anomaly detection since it is based on distance from an anchor point rather than between two classes of embeddings.

In some implementations, using the combination of both contrastive and triplet loss, as opposed to using either one in isolation, allows the training of the model to incorporate the benefits of both types of losses. For example, triplet loss can help with the reduction of false positives in anomaly detection, whereas contrastive loss can help with the identification of differences between embeddings with low variation, such as embeddings representing biometric data.

In some implementations, the weights used to generate the weighted combination of contrastive and triplet loss functions that constitutes the custom loss function can be dynamically determined during training based on the security context and data types that are targeted in the training.

In some implementations, the weights are dynamically determined during training based on a degree of similarity between the custom embedding vectors. The degree of similarity can be extrapolated from the modalities of the data represented by the custom embedding vectors. The degree of similarity can be an average of the distances between the custom embedding vectors or between the custom embedding vectors included in a subset of the custom embedding vectors. For example, if the modalities of data represented by the custom embedding vectors include biometric data, contrastive loss can be weighted more heavily because contrastive loss can help with the identification of differences between embeddings with low variation, such as embeddings representing biometric data. Similarly, if the modalities of data represented by the custom embedding vectors include location and/or time data, triplet loss can be weighted more heavily because deviations representing anomalies in location and time data can occur over a long period of time, since triplet loss is more effective at anomaly detection over long periods of time. In some implementations, the custom loss function can be dynamically adjusted during training by adding an additional loss function to be included in the weighted combination.

In some implementations, one or more of the loss functions used in training can be tuned for abnormality detection. To tune contrastive or triplet loss functions for abnormality detection, adjustments are made to the loss formulation, parameters and training strategies to align them with cyber-security-specific objectives. These tunings better assure that the embeddings effectively capture patterns of acceptable or "normal" behavior while sensitively detecting deviations indicative of threats. A parameter such as the margin can be dynamically adjusted based on the type and the severity of the threat while using threat-context weights to modify the margin during training. The margin can be a threshold distance at which two data points such that the multimodal model detects anomalous behavior when the distance between two data points is greater than the threshold distance.

Certain loss functions, such as the contrastive and triplet losses described above, have specific margins such that dissimilar data points are at least a threshold distance apart. Such thresholds can be used to classify the input into the multimodal model as anomalous behavior. However, in the case of multi-modal cyber threats, the threshold can be context-dependent. For example, anomalous behavior detection at an individual host may be performed using a low threshold because of the resulting impact being limited to the individual host only. In contrast, anomaly detection at a server level for an administrator may require a lower threshold, such that anomalous behavior is detected when the distance between data points is smaller, due to the potential of more widespread impact. Dynamic adjustments of margins, as described herein, can provide for such adaptability based on context.

As described above, the multimodal fusion layer 256 can select, for a custom embedding vector for a modality of data, a weight from the matrix corresponding to the modality of data. The multimodal fusion layer 256 can select the weight in the entry of the corresponding matrix that is located in the row that represents the measurement of the first criterion associated with the modality of data and in the column that represents the measurement of the second criterion associated with the modality of data. In some implementations, the multimodal fusion layer 256 can select a weight for a modality of data using a model, such as an NVLM. The model used to select the weight for a modality can be the same model used to generate the weights for the matrices described above. The model used to select the weight for a modality can be trained in the same way as the model used to generate the weights for the matrices described above.

After selecting the weights for the modalities, the multimodal fusion layer 256 can generate the combined embedding vector based on the selected weights and the plurality of custom embedding vectors. In some implementations, the combined embedding vector can be a weighted sum of the custom embedding vectors included in the plurality of custom embedding vectors, where the weight of custom embedding vectors is selected using the techniques described above.

In some implementations, the combined embedding vector is processed by one or more additional layers 258 trained to further improve accuracy of threat detection. The additional layers 258 generate one or more outputs based on the combined embedding vector. The one or more outputs can be of various types. In some implementations, the one or more outputs can represent an indication whether or not a multimodal attempt to access the digital system is unauthorized. In some implementations, the one or more outputs can represent a risk score, as described, for example in reference to the risk score module 208. In some implementations, the one or more outputs can represent indication of a risk mitigation strategy or actionable insight, as described, for example, with reference to the recommendation engine 110. In some implementations, the additional layers 258 can be configured to implement functionalities of one or more of the risk score module 208 and/or the recommendation engine 110, as described with reference to FIG. 2A.

In some implementations, the additional layers 258 can include the output layer 260 that generates a final output for the neural network based on the one or more outputs generated by the additional layers 258. The final output can be a representation of the one or more outputs that is presentable to a user of the system or device, such as a dashboard visualization. The final output can be an action that is taken by the system or device based on the one or more outputs, such as automated response triggers. For example, the final output can include or represent the output 212 of FIG. 2A described above.

Returning to FIG. 2A, the multimodal data fusion module 102 generates processed data 218. The multimodal data fusion module 102 can generate processed data 218 using any of the techniques performed by the modality-specific layers 252, the alignment layers 254, and the multimodal fusion layer 256 described above. The processed data 218 can include the combined embedding vector characterizing a potential cybersecurity threat generated by the multimodal fusion layer 256 described above.

The processed data 218 can be received by the risk score module 208. The risk score module 208 can be configured to generate a risk score 220 based on the processed data 218 using one or more of anomaly detection techniques 208a, threat pattern matching techniques 208b, historical comparison techniques 208c, and risk qualification techniques 208d. The risk score 220 can be based on the final embedding included in the processed data 218. For example, the risk score 220 can indicate the severity of the potential cybersecurity threat indicated by the data encoded in the final embedding. As another example, the risk score 220 can indicate whether the attempt to access the system or device indicated in the raw multimodal data 214 was unauthorized. The risk score 220 can be generated using a model, such as a generative large language model. The model can be trained using any suitable training techniques.

The recommendation engine 110 can be configured to receive the risk score 220 and generate an output 212 based on the risk score 220. The recommendation engine 110 can generate the output 212 using one or more of real-time alert generation 210a, mitigation strategies 210b, and predictive analytics 210c. The recommendation engine 110 can include one or more of the recommendation engine 110 of FIG. 1 and the policy generation agent 114 of FIG. 1. The recommendation engine 110 can include one or more models that are distinct from the one or more models included in the multimodal data fusion module 102 and the model that generates the risk score 220.

The recommendation engine 110 can be configured to generates actionable insights characterizing the potential cybersecurity threat indicated by the raw multimodal data 214. In some implementations, the recommendation engine 110 can generate threat mitigation recommendations based on analysis of the potential cybersecurity threat. The recommendation engine 110 generates threat mitigation recommendations by employing both reinforcement learning (RL) and decision trees.

The recommendation engine 110 can classify the risk score 220 using a decision tree. The decision tree used for these purposes can include one or more decision trees. For example, the recommendation engine 110 can classify the risk score 220 as either an indication of a cybersecurity threat to the system or device that merits a response, or an anomaly or other event that does not merit a response. The decision tree can be used to classify the risk score 220 according to any suitable classification. The classification need not be binary and can indicate any suitable feature related to the risk score 220.

The recommendation engine 110 can also use a decision tree to determine a response to a cybersecurity threat. The response can include, for example, one or more of alert generation, mitigation strategies, and threat mitigation recommendations. For example, a path of the decision tree can represent certain actions to be taken in response to the cybersecurity threat, such as warning a user, blocking a port on a firewall combined with logging out a user, revoking access, and notifying an administrator of the system or device. In some implementations, each path of the decision tree is an ordered risk mitigation procedure.

In some implementations, each path of the decision tree can be associated with a weight. The recommendation engine 110 can use the weights in selecting a path of the decision tree. For example, the recommendation engine 110 can favor selecting paths of the decision tree with higher weights over paths of the decision tree with lower weights. The weight for a given path of the decision tree can be based on a success rate of selecting the path, where the success rate indicates the effectiveness of the response determined by the recommendation engine 110 as a result of taking the path. For example, an RL agent can update the weights using information about the effectiveness of the responses determined by the recommendation engine 110, as described in further detail below.

In some implementations, the decisions made by the recommendation engine 110 in the course of utilizing the decision tree can be based on a query matrix algorithm. According to the query matrix algorithm, the cybersecurity threat indicated in the raw multimodal data 214 and characterized by the received risk score 220 can be quantified based on its similarity to known threats. For example, the query matrix algorithm can be used to evaluate a cybersecurity threat by comparing a corresponding multi-dimensional feature vector to corresponding feature vectors of known threats, and assigning one or more similarity scores to quantify an associated risk. The quantification of the cybersecurity threat can occur in a plurality of dimensions. For example, the query matrix algorithm can quantify the extent to which the sender metadata of the cybersecurity threat is similar to that of known threats; the extent to which the content features of the cybersecurity threat are similar those of known threats; and/or the extent to which the domain history associated with the cybersecurity threat is similar to that associated with known threats. The quantification by the query matrix algorithm can be based on features of the data received by the series of layers 250 and features of the known threats. The results of the quantification by the query matrix algorithm can be used by the recommendation engine 110 in making decisions in the course of using the decision tree to determine a response to the cybersecurity threat.

In some implementations, the operations of recommendation engine 110 and the query matrix algorithm are based on data stored in a database. The database can store data related to known threats. For example, the data related to known threats can include phishing templates, malicious domains, and historical attack metadata. This data can be used, for example, by the query matrix algorithm in quantifying the similarity of the cybersecurity threat to known threats. For example, the query matrix algorithm can compare the cybersecurity threat to known threats using this data.

The database can also store data related to historical responses determined by the recommendation engine 110 and corresponding outcomes of implementing the determined responses. For example, the responses determined by the recommendation engine 110 can be logged, along with the effectiveness or outcome of the corresponding response. This data can be used, for example, by the recommendation engine 110 in making decisions in the course of using the decision tree to determine a response to the cybersecurity threat. As another example, this data can be used by a RL agent in training the recommendation engine 110, as described in further detail below.

The database can also store data related to rules and thresholds that govern how the recommendation engine 110 traverses branches of the decision tree. For example, a threshold stored in the database can govern the recommendation engine 110 to choose one branch of the decision tree over another if the threshold for a certain criterion related to the cybersecurity threat is met. The rules and thresholds stored in the database can be based on predefined security policies for the system or device. Basing the use of the decision tree on these rules and thresholds can help to better assure that the decision tree remains interpretable and aligned with desirable policies.

In some implementations, after the recommendation engine 110 generates threat mitigation recommendations, the threat mitigation recommendations and other suitable information about the potential cybersecurity threat can be stored in the database. For example, information that classifies the potential cybersecurity threat can be stored in the database, along with information indicating the effectiveness of the threat mitigation recommendations generated by the recommendation engine 110 in mitigating the potential cybersecurity threat. The database, updated with this newly-stored information, can be used in the RL process to train the decision tree, described below.

In some implementations, the recommendation engine 110 can be trained using RL. As the recommendation engine 110 determines responses to cybersecurity threats, a RL agent can generate a reward for the corresponding response. The recommendation engine 110 can adjust the process by which it determines responses based on the generated rewards. For example, the recommendation engine 110 can adjust the weights of the decision tree that it utilizes to determine the response, or other parameters of the determination process. The reward generated by the RL agent can be based on policies of an administrator of the system or device of which the RL agent is made aware. The reward generated by the RL agent can be based on historical actions by the recommendation engine 110 and their corresponding outcomes, stored in a database, as described above.

For example, historical data regarding responses determined by the recommendation engine 110 can indicate that responding to a phishing attack directed at a system by logging a user out of the system has previously helped to reduce the chance of exposure of the system to malicious software. Therefore, the RL agent can generate a reward indicating a high effectiveness for the response of logging a user out of the system. The recommendation engine 110 can then adjust the weights of the decision tree such that any paths of the decision tree representing the action of logging a user out of the system have higher weights.

Similarly, historical data regarding responses determined by the recommendation engine 110 can indicate that responding to a phishing attack directed at a system by contacting an administrator of the system resulted in lost productivity and was ineffective at mitigating the attack. Therefore, the RL agent can generate a reward indicating a low effectiveness for the response of contacting an administrator of the system. The recommendation engine 110 can then adjust the weights of the decision tree such that any paths of the decision tree representing the action of contacting an administrator have lower weights. Thus, when determining responses to future phishing attacks, the recommendation engine 110 will favor paths representing the action of logging a user out over paths representing the action of contacting an administrator.

In some implementations, the RL agent dynamically updates weights of paths of the decision tree based on a path of the decision tree previously selected by the recommendation engine 110. For example, the selection of a path of the decision tree by the recommendation engine 110 can update a state of the system. The RL agent can then update the weights of the remaining paths of the decision tree available to the actionable insights module in response to the updated state of the system.

As a more specific example, in a response to a phishing attacked directed to a system, the recommendation engine 110 can select a path of the decision tree that represents locking out a user of the system based on whether an email representing the phishing attack arrived at a time outside of standard hours. The user can then be locked out of the system, resulting in an updated state of the system. The RL agent can then update the weights of the paths of the decision tree in response to the updated state of the system. The recommendation engine 110 then selects a subsequent path of the decision tree using the updated weights.

For example, the recommendation engine 110 can next select a path of the decision tree that represents sending a warning to the user based on whether the user clicked on a malicious link in the email. A warning can then be sent to the user, resulting in a second updated state of the system. The RL agent can then update the weights of the paths of the decision tree in response to the second updated state of the system, and the recommendation engine 110 will select subsequent paths of the decision tree using the updated weights. The RL agent can continue to dynamically update the weights of the decision tree in this way as the recommendation engine 110 selects paths of the decision tree in determining a response to a cybersecurity threat.

In some implementations, dynamic updating of the weights by the RL agent can provide certain advantages by adding a degree of adaptability to the utilization of the decision tree. For example, the risk mitigation strategies generated by the recommendation engine 110 using dynamic updating of the weights by the RL agent can be more effective in mitigating potential cybersecurity threats because they are tailored to the current state of the system.

As described above, the risk score 220 received by the recommendation engine 110 is generated based on data that can include multiple modalities of data. This incorporation of information regarding multiple modalities into the operations of the recommendation engine 110 is beneficial because the information regarding multiple modalities can better characterize the nature of the potential cybersecurity threat. This allows the recommendation engine 110 to generate risk mitigation strategies that are better tailored to the potential cybersecurity threat. For example, information regarding multiple modalities can better indicate how malicious a potential cybersecurity threat is and allow the recommendation engine 110 to more effectively determine how much evasive action should be taken in response.

Advantageously, the foundation of historical data and known threats in combination with the query matrix algorithm used in the RL process and decision trees of the risk mitigation strategy generation described herein allows for the generation of more intelligent risk mitigation strategies. The query matrix algorithm is used to indicate the similarity of a potential cybersecurity threat to known threats, along a number of dimensions (each dimension corresponding to a different criterion of similarity). Thus, the model can base its risk mitigation strategy generation on the extent to which a potential threat is similar to a known threat. For example, the model can generate strategies involving escalated responses to potential threats that resemble known threats. As another example, the model can generate strategies in response to known threats that are similar to other strategies that have historically been effective.

In some implementations the output 212 can include a dashboard visualization 212*a* presented to a user. The dashboard visualization can include information characterizing the potential cybersecurity threat indicated by the raw multimodal data 214 from the external data source 101. For example, the dashboard visualization can include an indication of the severity of the potential cybersecurity threat. The dashboard visualization can include indications of recommended actions to be taken by the user to mitigate or eliminate the potential cybersecurity threat.

In some implementations, the output 212 can include automated response triggers 212*b*. The automated response triggers can facilitate an automatic response to the risk score 220. This can be beneficial because in some cases a potential cybersecurity threat can be addressed through immediate action. In such cases, presenting information about the potential cybersecurity threat to a user and waiting for the user to respond with action to mitigate the threat may take too long, such that any action taken by the user would have no effect on reducing the threat. Therefore, in such cases, the threat can be effectively addressed by bypassing user involvement and instead taking automatic action in response to the threat.

In some implementations, the output 212 can be part of a substantially continuous learning loop 212*c*. In other words, the output 212 can be used to train the RA agent 108. For example, the output 212 can be compared to a desired output to generate an indication of the comparison of the output 212 to the desired output, such as a reward or an error value. The indication of the comparison can then be used to adjust parameters of the RA agent 108. For example, the output 212 can be compared to a desired output to produce a feedback signal, such as a reward or an error value, and the feedback signal can be used to adjust the parameters of the RA agent 108 through techniques such as gradient descent, reinforcement learning, or a combination of supervised and unsupervised learning. The training process can be iterative, allowing the RA agent to improve-substantially continuously—the ability to analyze risks and detect threats in a dynamic cybersecurity environment.

In some implementations, there can be substantially continuous learning loops between various modules of the RA agent 108, such that intermediate outputs of some modules are used to improve and refine other modules. Such substantially continuous learning loops are indicated in FIG. 2A by the dotted arrows connecting various modules of the RA agent 108.

The use of alignment layers in the system described above with reference to FIG. 2A and FIG. 2B aligns data of different modalities of different formats into a common space, allowing for using information from various modalities associated with complex cybersecurity attacks. This can improve efficiency and effectiveness of threat detection and mitigation as compared to cybersecurity systems that rely only on a single modality of data. By incorporating multiple modalities of data into its threat detection and analysis, and analyzing them in a balanced, intelligent way, as described herein, the system can enable accurate and effective detection and analysis of potential cybersecurity threats that could potentially go undetected otherwise.

Figure 3:
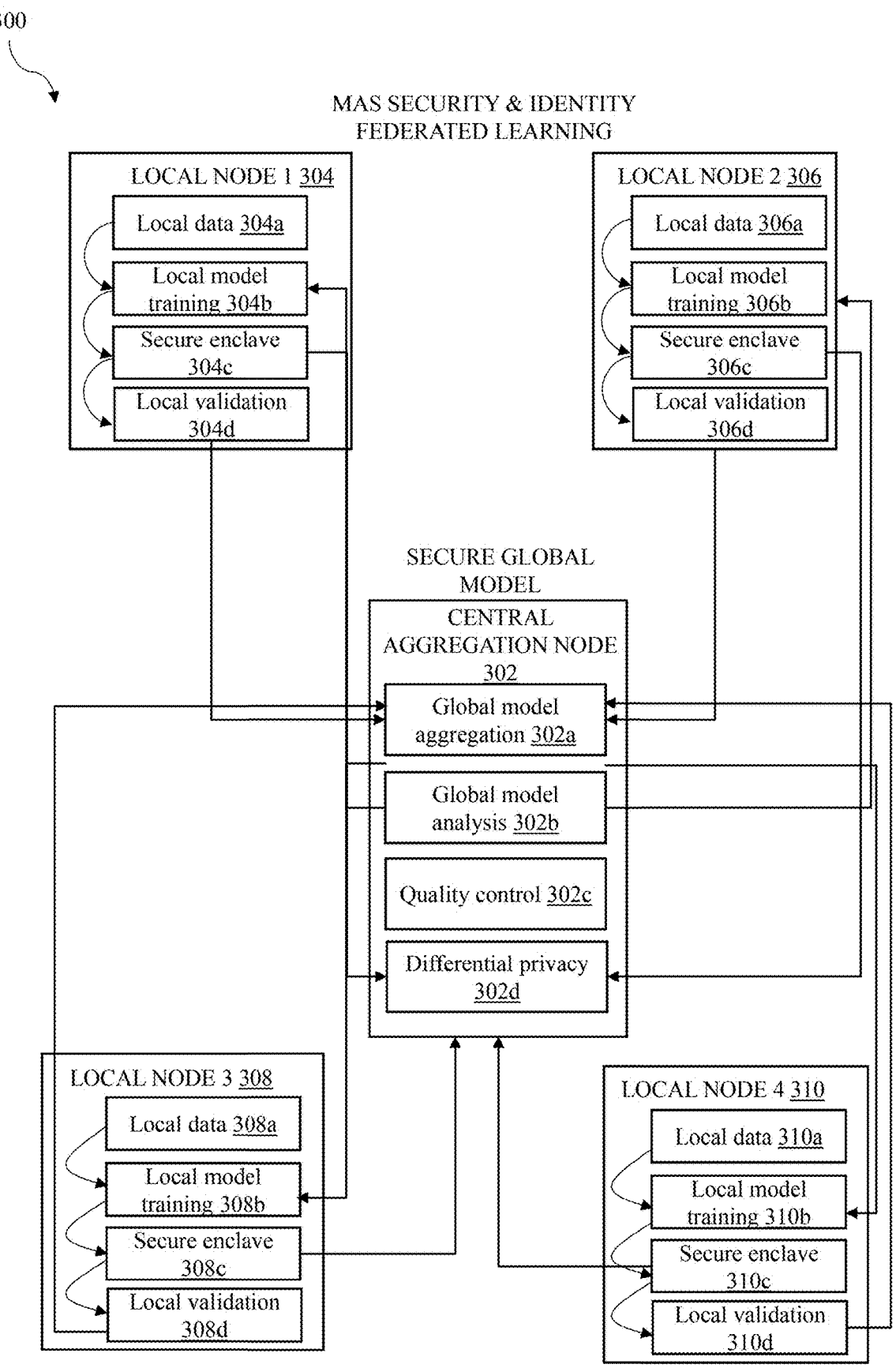
FIG. 3 is an example system for implementing coordinated cybersecurity threat detection across a distributed system.

FIG. 3 is an example system 300 for implementing coordinated cybersecurity threat detection across a distributed system. In some implementations, intelligently designed federated learning can be used to realize accurate and effective cybersecurity threat mitigation in such distributed systems. FIG. 3 shows an example of how federated learning can be used within the system 300 to train models across decentralized sources, and how raw data can be kept local while sharing only model updates among nodes. In some implementations, this can facilitate training individual nodes on sensitive and/or contextual data to realize highly effective and context-aware training, while sharing relevant model updates with other nodes without providing the other nodes access to the sensitive data. This can be particularly effective in cybersecurity threat detection where preserving data privacy can be of as much interest as context-awareness. The technology described herein allows for updating nodes of the distributed system through model updates while restricting access of the underlying raw data to authorized nodes only.

In some implementations, the system 300 can be a system of one or more computing devices located in one or more locations and/or performing different functions. The system 300 can include or represent the federated learning module 112 of FIG. 1. The system 300 can be part of a larger threat detection system, e.g., the threat detection system 100 of FIG. 1, appropriately programmed in accordance with this specification.

In some implementations, the system 300 includes a central aggregation node 302 configured to coordinate federated learning among multiple other local nodes. In the example of FIG. 3, the central aggregation node 302 is in communication with four local nodes: local node 304, local node 306, local node 308, and local node 310. However, this is but one example, and the central aggregation node 302 can be in communication with a larger or smaller number of local nodes without deviating from the scope of this disclosure. A local node with which the central aggregation node 302 is in communication with can be a system that detects and/or analyzes potential cybersecurity threats. For example, a local node can be an RA agent, e.g., the RA agent 108 of FIG. 2A, appropriately programmed in accordance with this specification.

In some implementations, what constitutes as a cybersecurity threat can depend on the nature/function of a particular node, and vary from one node to another. In one example, one particular node can be a server providing a portal for patients to access their healthcare data. Because this portal is outward-facing, log-in attempts to the portal from an external device may not necessarily be perceived as a cybersecurity threat. On the other hand, a different node can represent a secure database that is accessible only to authorized personnel, and log-in attempts to the database from an external/unauthorized device is likely to be a cybersecurity threat. As such, in order to effectively detect threats, the context-aware training at the two nodes may need to be done differently, potentially using local contextual data. At the same time, model parameters from one node may need to be provided to other nodes in order to implement/improve training at the other nodes. The federated learning paradigm using a multi-agent system (MAS), as described herein, facilitates exchanging model parameters among nodes without sharing raw data that may have been used in realizing highly-effective training at individual nodes.

In some implementations, each local node receives local data 304a, 306a, 308a, and 310a from a local data source that indicates a potential cybersecurity threat. The local data source can be a system or device that is susceptible to cybersecurity attacks, e.g., the external data source 101 of FIG. 2A. The local data received by the local node can be the raw multimodal data 214 of FIG. 2A. The local node generates an output characterizing the potential cybersecurity threat based on the received local data. For example, the local node can generate an output such as output 212 of FIG. 2A using the techniques described above in reference to FIG. 2A.

A local node can include one or more local models used to generate the output based on the received data. In some implementations, each local node can include a copy of the same one or more local models. The one or more local models can be any suitable models (e.g., neural networks, sets of weighted matrices, or any of the models described above in reference to FIG. 2A and FIG. 2B). In some implementations, the one or more local models can have respective model parameters. Thus in some implementations, each local node can be associated with a corresponding plurality of parameters.

In some implementations, each local node performs local model training 304b, 306b, 308b, and 310b. The one or more local models at a given node can be trained using any suitable training techniques (e.g., the training techniques described above in reference to FIG. 2B). The training techniques used to train the copy of the one or more local models can involve a number of training iterations. A training iteration can result in updates to the parameters of the copy of the one or more local models. The training of the copy of the one or more local models for the local node is based on the local data received by the local node.

In some implementations, a local node can perform local validation 304d, 306d, 308d, and 310d as part of a training iteration for the local node. For example, a local node can process new data that is different from the data on which the copy of the one or more local models is trained. A local node can use results of processing the new data to assess the quality of the updates to the parameters of the copy of the one or more local models that resulted from the training. The local validation 304d, 306d, 308d, and 310d can include other suitable validation techniques.

In some implementations, after a local node undergoes a training iteration, the local node can communicate to the central aggregation node 302 information indicative of the updates to the plurality of parameters associated with the local node resulting from the training iteration. The information can include values of the updated parameters and/or computed gradients (i.e. derivatives of a loss function with respect to model parameters).

In some implementations, based on the information indicative of the updates to the plurality of parameters associated with each local node, the central aggregation node 302 can generate a set of global updates to the parameters of the one or more local models. In some implementations, the central aggregation node 302 can perform global model aggregation 302a. For example, the central aggregation node 302 can aggregate the values of the updated parameters or the gradients received from the local nodes. In some implementations, the central aggregation node 302 can combine the values of the updated parameters or the gradients received from the local nodes in such a way that information received from each local node is weighted based on the size or quality of the data received by the local node. The set of global updates can then be communicated to the local nodes. A local node can then update the parameters of the copy of the one or more local models associated with the local node based on the set of global updates.

The federated learning techniques employed in the system 300 can be advantageous because they help to avoid the leakage of potentially private or sensitive data. The data received by each local node indicative of a potential cybersecurity threat can be sensitive and/or include private information about a user of the system or device experiencing the potential threat. The federated learning techniques of system 300 better assure that sensitive, user-specific information remains on the local nodes without being communicated to the central aggregation node 302. This can be beneficial because the communication of the sensitive, user-specific information can risk the leakage of the information.

Additional advantages provided by the federated learning techniques employed in the system 300 include the fact that local updates can be carried out at the local nodes, providing quick local learning. The latency is reduced by having small local updates aggregated by the central aggregation node 302 instead of having a large batch update. The faster contextual awareness is shared by multiple agents through this federated process. Thus, the federated learning techniques employed by the system 300 can provide both the security benefits of privacy-preserving gradient exchange and the speed and flexibility of distributed learning.

These benefits can be achieved by the federated learning techniques by sharing only the values of updated model parameters or computed gradients (i.e, derivatives of a loss function with respect to model parameters) among the local nodes, potentially through the central aggregation node 302, sensitive raw data—e.g., raw user-specific data, intermediate computations based on the raw user-specific data, or feature representations of the raw user-specific data—may be prevented from being shared, thereby preserving sensitivity/privacy associated with the raw data. However, the information transmitted by a local node still encapsulates the learning from the data received by the local node. For example, gradients can reflect the learning from the data received by the local node. Gradients encode the direction and magnitude of updates needed for a parameter of the one or more local models included in the local node, effectively conveying the learning signal of the local node to the central aggregation node 302. This ensures that the set of updates generated by the central aggregation node 302 benefits from all received data, without the central aggregation node 302 needing direct access to it.

In some implementations, the federated learning techniques of the system 300 can be implemented such that central aggregation node 302 does not transmit all parameters of the one or more local models indiscriminately, but instead intelligently selects subsets of parameters, or prioritized parameters, based on the context of the potential cybersecurity threat. For example, only the parameters of layers dealing with text data like transformer-based embeddings are transmitted in the context of detecting phishing emails. As another example, parameters tied to behavioral analysis layers like those handling typing speed or login times are prioritized in the context of detecting anomalous activity in access logs. As another example, gradients with a greater impact in the context of the potential cybersecurity threat, as measured by their magnitude or influence on the reduction of a loss function, are prioritized for transmission. In some implementations, a lightweight parameter scoring mechanism can evaluate the impact of gradients and can prioritize gradients with larger impacts that signify substantial updates. As another example, layers of the one or more local models corresponding to less relevant modalities in a given context may be excluded or down-sampled.

In such implementations, the transmission of only a subset of parameters can be beneficial because it helps to ensure that sensitive data from unrelated modalities is not unnecessarily exposed. This approach can help to assure that federated learning is not only privacy preserving but also contextually optimized. Additionally, this approach can reduce bandwidth by limiting the number of parameters transmitted to only task-relevant parameters.

In some implementations, the federated learning techniques of the system 300 can utilize a hierarchical key exchange protocol, which can be beneficial in a quantum computing domain. Traditional cryptographic systems like RSA and ECC can be vulnerable to quantum computing based attacks. Quantum-resistant cryptography, which relies on hard mathematical problems such as lattice-based or code-based encryption, generates quantum-resistant root keys-cryptographic keys generated using such post-quantum algorithms, designed to remain secure against quantum attacks. For example, in some implementations, a central trusted authority generates quantum resistant root keys, which are distributed securely to regional aggregation nodes (a regional aggregation node can be, e.g., the central aggregation node 302 of FIG. 3). These nodes, in turn, manage localized key exchanges with the local nodes with which they are in communication, reducing the overhead of direct key synchronization across all participants. In some implementations, advanced techniques, such as gradient sparsification and model pruning, are applied to reduce the size of the data being encrypted. The encryption level dynamically adjusts based on device capabilities and network conditions.

A hierarchical federated aggregation system is advantageous because it minimizes or otherwise optimizes the number of post-quantum cryptographic operations required by consolidating updates at intermediary nodes before transmitting them to the central server. This reduces the overall computational load and bandwidth usage. For example, traditional federated learning typically relies on basic encryption protocols. While this is effective in conventual computing environments, these methods have limitations in terms of resilience against quantum computing threats. Advanced cryptographic techniques, however, often generate larger keys and ciphertexts than traditional methods. This increased data size can strain network bandwidth, especially in federated learning systems involving thousands of participants. The decentralized nature of federated learning complicates key distribution and management for advanced encryption systems. Synchronizing post-quantum keys securely across diverse and geographically distributed clients presents logistical and technical challenges. A hierarchical key exchange can address these issues regarding the complexity of key distribution by reducing the overhead of key synchronization across all participants in the system employing federated learning, as described above.

In some implementations, the federated learning techniques of the system 300 can be integrated with a multi-agent system (MAS) framework. For example, in a training iteration, a local node can produce one or more intermediate outputs prior to generating the output characterizing the potential cybersecurity threat. Likewise, for a training iteration, the central aggregation node 302 can produce one or more intermediate outputs prior to generating the set of updates to the parameters of the one or more local models. The system 300 can include a number of policy agents (not shown in FIG. 3) that analyze the one or more intermediate outputs produced by individual local nodes and/or the central aggregation node 302. Based on the one or more intermediate outputs, the policy agents can adjust policies or request additional insights. The policy agents can adjust the policies or request the additional insights prior to the completion of a training iteration.

In some implementations, the one or more intermediate outputs produced by the local nodes and the central aggregation node 302 can include partial embeddings or early predictions. Based on the one or more intermediate outputs, the policy agents can generate updates to subsets of parameters of the one or more local models. These updates can be applied to the subsets of parameters separately from and in addition to updates to the plurality of parameters associated with individual local nodes. In some implementations, these updates can be applied to the subsets of parameters separately from and in addition to the set of updates generated by the central aggregation node 302. In some implementations, these updates can constitute the set of updates generated by the central aggregation node 302.

In some implementations, a policy agent can generate updates to a different subset of parameters. For example, in some implementations, a policy agent can generate updates to a subset of parameters associated with a set of layers of the one or more local models, where each layer in the set of layers is related to the same aspect of the output generated by each local node. For example, the policy agents can include a threat-detection agent that monitors real-time data for anomalies and generates updates to a subset of parameters associated with a set of layers related to detecting threats. As another example, the policy agents can include a compliance-monitoring agent that detects real-time updates to regulatory requirements and generates updates to a subset of parameters associated with a set of layers related to ensuring compliance with regulatory updates. Thus, for example, if a new General Data Protection Regulation (GDPR) requirement emerges, the compliance-monitoring agent can update a set of layers of the one or more local models such that outputs generated by the one or more local models incorporate the requirement. As another example, the policy agents can include an access control agent that generates updates to a subset of parameters associated with a set of layers related to enforcing user authentication policies.

In some implementations, a policy agent can generate updates to a subset of parameters associated with the copy of the one or more local models included in a particular local node. For example, a policy agent can generate updates to the plurality of parameters associated with a particular local node based on data related to the specific context in which the particular local node operates (e.g., the geographic location of the particular local node, and/or the system or device from which the particular local node receives data). The updates generated by the policy agent can be in addition to any updates to the parameters of the copy of the one or more local models resulting from the completion of a training iteration at the particular local node.

In some implementations, the subset of parameters to which a policy agent generates updates can be defined by both the particular local node with which it is associated and the set of layers of the one or more local models with which it is associated. For example, a policy agent can generate updates to a subset of parameters that includes the parameters associated with a set of layers, where each layer in the set of layers is related to a particular aspect of the output generated by a particular copy of the one or more local models included in a particular local node. As a more specific example, a policy agent can generate updates to a subset of parameters associated with a set of layers of a copy of the one or more local models on a particular local node related to detecting threats.

In some implementations, the integration of federated learning techniques with a MAS framework can be beneficial because it is considered more effective than standalone federated learning approaches. For example, traditional federated learning focuses solely on model training across decentralized data sources, with limited real-time adaptability in decision-making and policy updates. The MAS component described herein provides a framework in which policy agents can update system parameters, in addition to the federated learning updates occurring in the system, by actively adapting subsets of parameters associated with individual policy agents in response to real-time data, such as real-time threat data, real-time regulatory data, and real-time user-authentication data. Static federated learning techniques (i.e., federated learning techniques that are not integrated with a MAS framework in this way) cannot achieve this outcome independently. The MAS framework enables policy agents to interact substantially continuously with federated learning models, such as the one or more local models and/or the central aggregation node 302 in the system 300. This enables the models to learn from the evolving threat data and regulatory changes. This setup allows a system including multiple threat detection systems, such as the system 300, to generate adaptive policies that adjust in real-time, a dynamic capability that is less feasible in traditional federated learning setups focused on periodic model updates. Additionally, integrating the federated learning techniques of the system 300 with a MAS framework supports a distributed microservices architecture, which isolates agents functionally and geographically, for example. This modularity enhances resilience, making the system scalable for large-scale deployments where multiple agents can operate independently and handle specific policy tasks within their secure environments.

In some implementations, the federated learning techniques of the system 300 are further enhanced by utilizing secure enclaves. For example, each of the local nodes in communication with the central aggregation node 302 can be housed in a secure enclave 304c, 306c, 308c, and 310c. In some implementations, the secure enclave at each local node can be a Trusted Execution Environment (TEE), or a secure area of a main processor in which data is protected. For each local node, local data 304a, 306a, 308a, and 310a received by the local node can be protected as a result of the local node being housed in the TEE.

For example, for each local node, the received local data can be encrypted so that it is not accessible by other parts of the system 300. In some implementations, the received local data can be encrypted using a symmetric encryption method, such as AES-256-GCM encryption. In some implementations, the received local data can be encrypted using post-quantum cryptographic techniques.

Some implementations can utilize hardware-level optimizations to the system 300 and/or to the TEEs included in the system 300 to maintain efficient processing while employing encryption such as the encryption techniques described above. For example, instead of processing all parameters of the one or more local models at once, computations can be divided into smaller micro-batches that fit within the memory constraints of a TEE. Gradient updates can be split into subsets and processed sequentially, reducing peak memory usage. Asynchronous task scheduling can be used to parallelize independent operations while ensuring serialized handling of dependent tasks. Model partitioning of the one or more local models can be used to limit the number of operations to be performed on a given TEE at one time. For example, the model partitioning can be such that only the most sensitive portions of the model are processed within the TEE, while less sensitive operations occur outside the TEE. Aggregation algorithms like secure federated averaging, can be re-engineered for low memory and computational footprints, enabling efficient global model updates. Hardware-level optimizations such as these can be beneficial because they combine TEE-specific enhancements with the complexities of multimodal embedding processing while dynamically adjusting resource allocation and task scheduling to ensure seamless operation under varying computational loads.

Some implementations can utilize specialized data embedding techniques that reduce computation complexity, allowing TEEs to process complex multimodal embeddings without sacrificing privacy. This can be beneficial because TEEs are not typically optimized for high-dimensional, multimodal data processing, and therefore algorithmic modifications, such as the specialized data embedding techniques, can be employed in order to adapt them to handle high-dimensional, multimodal data processing. In some implementations, the specialized data embedding techniques can include low-rank embedding decomposition, sparse embedding, quantized embeddings, hierarchical embedding representations, dimensionality reduction through shared embedding space, denoising autoencoders for embedding compression, and attention-based embedding pruning.

In some implementations, the utilization of secure enclaves such as TEEs allows for realizing federated learning among multiple agents—each of which may handle sensitive data locally—while ensuring privacy/security of the sensitive data. In some implementations, this in turn can ensure regulatory compliance and privacy standards associated with the sensitive data.

In some implementations, the system 300 can leverage event-driven architectures such as the open-source platform Apache Kafka. Integrating MAS with federated learning can introduce additional communication demands—for example because agents can be required to exchange updates without substantially affecting system latency—and event-driven architectures can be used to support such additional demands. Leveraging event-driven architectures such as Apache Kafka can provide for efficient messaging, minimizing latency and allowing agents to respond promptly to policy updates. Additionally, it can help to better assure that policies are adapted quickly without compromising the speed of real-time threat response.

Figure 4:
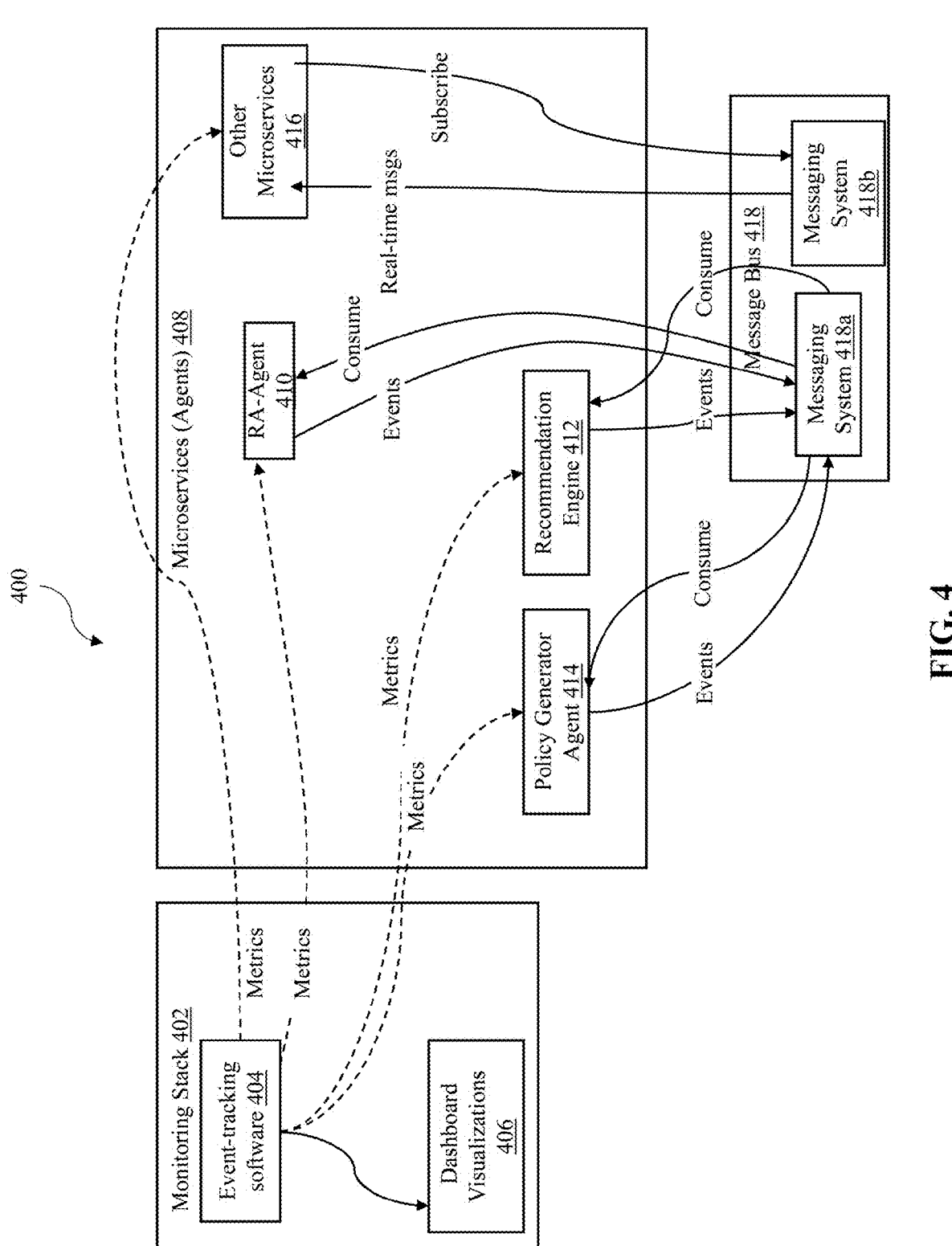
FIG. 4 is an example system of microservices with communication orchestrated by a container orchestration system.

FIG. 4 is an example system 400 of microservices (i.e., agents) with communication orchestrated by a container orchestration system. In some implementations, the container orchestration system is Kubernetes. In some implementations, the system 400 can be a threat detection system. In some implementations, the system 400 can be a system that detects, monitors, and analyzes potential cybersecurity threats for a system or a device. For example, the system 400 can be the threat detection system 100 of FIG. 1. The system 400 includes a monitoring stack 402, a microservices subsystem 408, and a message bus 418. The message bus 418 can include or represent the message queue 106 of FIG. 1.

The monitoring stack 402 includes an event-tracking software 404 be configured to track various metrics of events that are received and processed by the system.

The monitoring stack 402 also includes a dashboard system 406. In the example of FIG. 4, the dashboard system 406 includes dashboard visualizations. The dashboard visualizations can be configured to be used in combination with the event-tracking software 404 to track the metrics of events that are received and processed by the system. For example, the dashboard system 406 can display event metrics using dashboards and/or other suitable visualizations. In some implementations, open source tools such as Prometheus and Grafana can be used as the event-tracking software and the dashboard, respectively, to implement at least portions of the systems described herein.

The microservices subsystem 408 includes a plurality of microservices, or agents. The plurality of microservices can include agents that perform operations within the system 400. For example, each agent in the plurality of microservices can receive input based on events received by the system 400 and process the input to generate an output. In some implementations, the output generated by each agent can relate to the cybersecurity of a system or device monitored by the system 400.

In some implementations, the plurality of microservices includes a risk analysis (RA) agent 410. The RA agent 410 can be the RA agent 108 of FIG. 2A. The RA agent 410 ingests input based on events received by the system 400 and process the input using a threat detection model. For example, the RA agent 410 can process the input using techniques similar to those used by the RA agent 108, described above with reference to FIG. 2A. As a result of processing the events, the RA agent 410 generates an output that can include risk scores and/or anomaly insights.

In some implementations, the plurality of microservices includes a recommendation engine 412. The recommendation engine 412 can include or represent the recommendation engine 110 of FIG. 1 and/or the recommendation engine 110 of FIG. 2A. The recommendation engine 412 receives input based on events received by the system 400. For example, the input received by the recommendation engine 412 can be the risk scores and/or anomaly insights generated by the RA agent 410. The recommendation engine 412 processes the received input, for example, using the techniques employed by the recommendation engine 110 described above with reference to FIG. 2A. As a result, the recommendation engine 412 generates an output. The output can include mitigation strategies and/or recommended actions, e.g., in response to a cybersecurity threat to a system or device.

In some implementations, the plurality of microservices includes a policy generator agent 414. The policy generator agent 414 can include or represent the policy generation agent 114 of FIG. 1 and/or the recommendation engine 110 of FIG. 2A. The policy generator agent 414 receives input based on events received by the system 400. For example, the input received by the policy generator agent 414 can be the mitigation strategies and/or recommended actions generated by the recommendation engine 412. The policy generator agent 414 processes the received input, for example, using the techniques employed by the recommendation engine 110 described above with reference to FIG. 2A. As a result, the policy generator agent 414 generates an output. The output can include security policies or updates to security policies, e.g., for a system or device experiencing a cybersecurity threat. For example, the security policies or updates can incorporate analysis of a potential cybersecurity threat performed by other agents included in the plurality of microservices that ensure that the system or device remains responsive to the potential cybersecurity threat.

In some implementations, the plurality of microservices can include other microservices 416, other than the RA agent 410, recommendation engine 412, or policy generator agent 414, that perform operations in the system 400. For example, the other microservices 416 can include an authentication service that helps to facilitate alignment of user authentication of a system or device with security policies for the system or device generated by the system 400. As an example, the other microservices 416 can include policy agents that are used to employ federated learning techniques in the system 400, such as the policy agents described above with reference to FIG. 3.

The message bus 418 includes a messaging system 418a and a messaging system 418b configured to to stream data that is received by the system 400 as events and/or messages for further processing by other components of the system 400. The messaging system also facilitates the communication of information between components of the system 400 by streaming the information as messages to be processed by system components. In some implementations, the messaging system facilitation any communication of information between components of the system 400 that follows in the description of the operation of the system 400 below. The messaging system helps to facilitate low-latency communication between components. In some implementations, Apache Kafka® and NATS can be used as the messaging systems 418a and 418b to implement at least portions of the systems described herein. External data such as login events, network traffic, or biometric data enters the system 400. Upon entering the system, the external data passes through the message bus 418. The messaging system of the message bus 418 streams the data as events and/or messages. This streamed data is then forwarded to one or more microservices of the plurality of microservices included in the microservices subsystem 408. While receiving the streamed data, the one or more microservices are in communication with components of the monitoring stack 402, such as the event-tracking software 404 and the dashboard system 406. The components of the monitoring stack 402 monitor the streamed data to better assure that its receipt by the one or more microservices is smooth and to better assure overall system health throughout the intake process.

Upon receiving the streamed data, the RA agent 410 of the microservices subsystem 408 processes the data using a threat detection model and generates an output that can include risk scores and/or anomaly insights. The output generated by the RA agent 410 is communicated to the recommendation engine 412 using real-time messages via gRPC Remote Procedure Calls (gRPC).

Upon receiving the output generated by the RA agent 410, the recommendation engine 412 processes it to generate an output that can include mitigation strategies and/or recommended actions. The recommendation engine 412 sends its output to the policy generator 414 via gRPC calls. This can help to provide real-time updates to better assure the system 400 remains responsive to threats.

Upon receiving the output from the recommendation engine 412, the policy generator 414 generates security policies based on the output. The policy generator 414 can alternatively or additionally update existing security policies based on the output. The policy generator 414 sends the policies and/or updated policies to the RA agent 410 and/or other microservices 416 via gRPC calls. In some implementations, real-time messages related to the policies and/or updated policies are broadcast using the messaging system (e.g., Apache Kafka) of the message bus 418. This can help to better assure that all relevant microservices are aware of the policies and/or updated policies.

In implementations in which the other microservices 416 includes an authentication service, the authentication service can receive recommendations from the recommendation engine 412 and/or policies from the policy generator 414. The authentication service can help to assure that user authentication of the system or device aligns with the received recommendations and/or policies.

The results of the analysis of data received by the system 400 can be implemented in the system or device for which the system 400 is monitoring potential cybersecurity threats in real-time. For example, policies generated by the system 400 using the techniques described above can be enforced in real-time. Updates regarding the effects of the implementation of the results can be sent to the RA agent 410 for further analysis, e.g., so that the RA agent 410 can incorporate any effects into its future analysis of potential cybersecurity threats.

Throughout the operation of the system 400 as described above, information such as the performance of the system 400 and results of the analysis of potential cybersecurity threats is captured as metrics. The event-tracking software 404 and/or the dashboard system 406 of the monitoring stack 402 generate visualizations of these metrics. For example, the dashboard system 406 can generate real-time dashboards that display anomaly counts, policy updates, and system activity. The generated visualizations can be beneficial for monitoring system health and performance.

Figure 5:
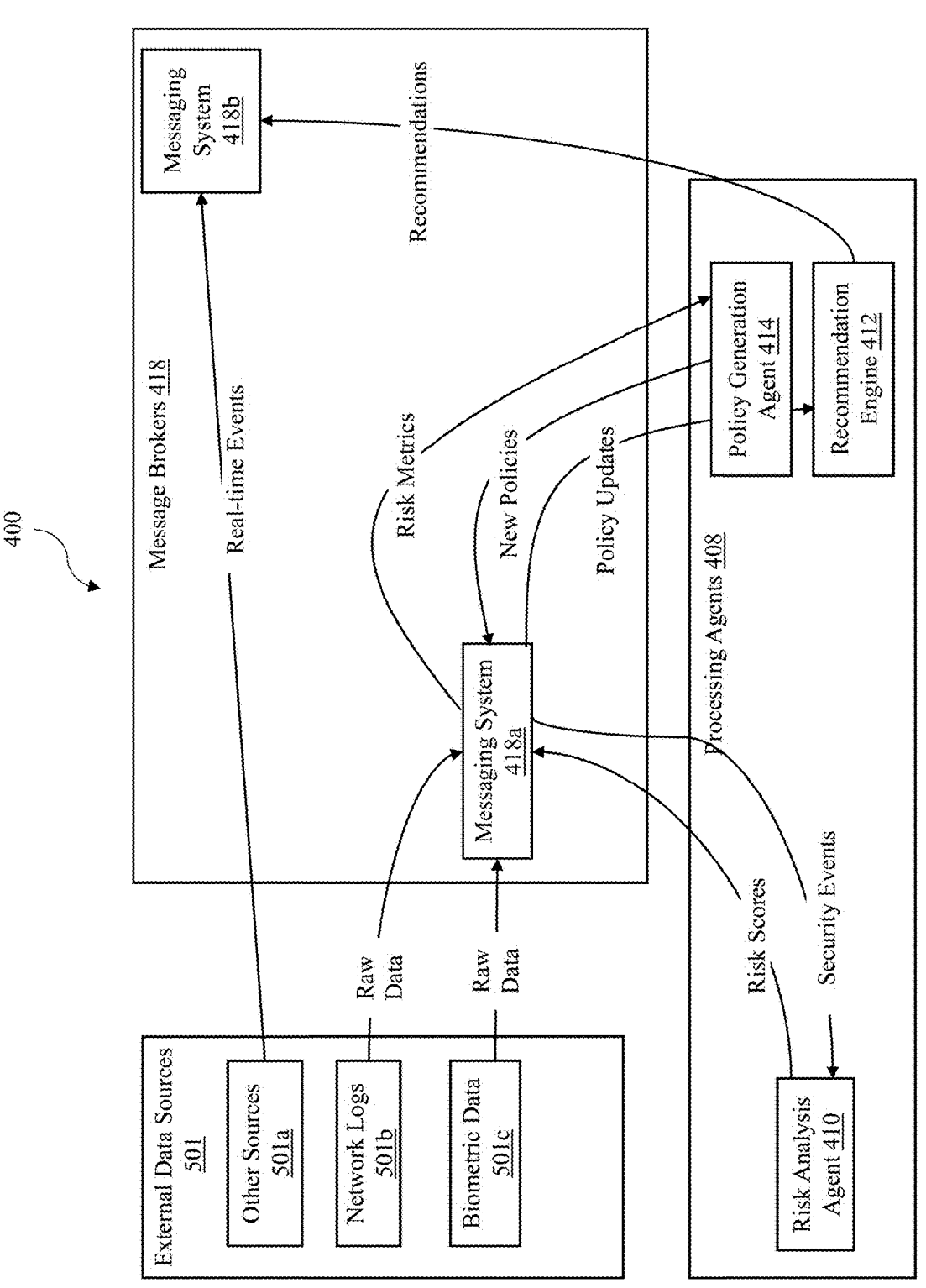
FIG. 5 is an alternative view of an example system of microservices that demonstrates the data flow between agents using messaging systems.

FIG. 5 is a schematic diagram that demonstrates data flow between agents using messaging systems. FIG. 5 shows how messaging systems like Apache Kafka and/or NATS are used for secure communication in the system 400 and demonstrates the event-driven architecture of the system 400. In some implementations, FIG. 5 shows how the messaging system of the system 400 acts as a broker between components of the system 400. The processing agents 508 can include or represent the microservices subsystem 408 of FIG. 4. The message brokers 518 can include or represent the message bus 418 of FIG. 4

External data 501 such as network logs 501*b*, biometric data 501*c*, and/or data from other sources 501*a* enters the system 400. Upon entering the system, the external data passes through the message brokers 418. The message brokers 418 can include one or more messaging systems.

The one or more messaging systems, including messaging systems such as the messaging system 418*a* and the messaging system 418*b*, of the message brokers 418 stream the data as events and/or messages to one or more microservices of the processing agents 408. In some implementations, the messaging system 418*a* can be Apache Kafka®. In some implementations, the messaging system 418*b* can be NATS.

Upon receiving the streamed data, the RA agent 410 of the processing agents 408 processes the data using a threat detection model and generates an output that can include risk scores and/or anomaly insights. This output then passes through the messaging system, which streams it as messages to be received by other components of the system 400.

Upon receiving the output generated by the RA agent 410 and streamed by the messaging system, the recommendation engine 412 processes it to generate an output that can include mitigation strategies and/or recommended actions. This output then passes through the messaging system, which streams it as messages to be received by other components of the system 400.

Upon receiving the output generated by the recommendation engine 412 and streamed by the messaging system, the policy generator 414 generates security policies and/or updates to security policies based on the output. This output then passes through the messaging system, which streams it as messages to be received by other components of the system 400.

The messaging system can stream recommendations generated by the recommendation engine 412 and/or policies generated by the policy generator 414 to enforcement microservices of the system 400.

Figure 6:
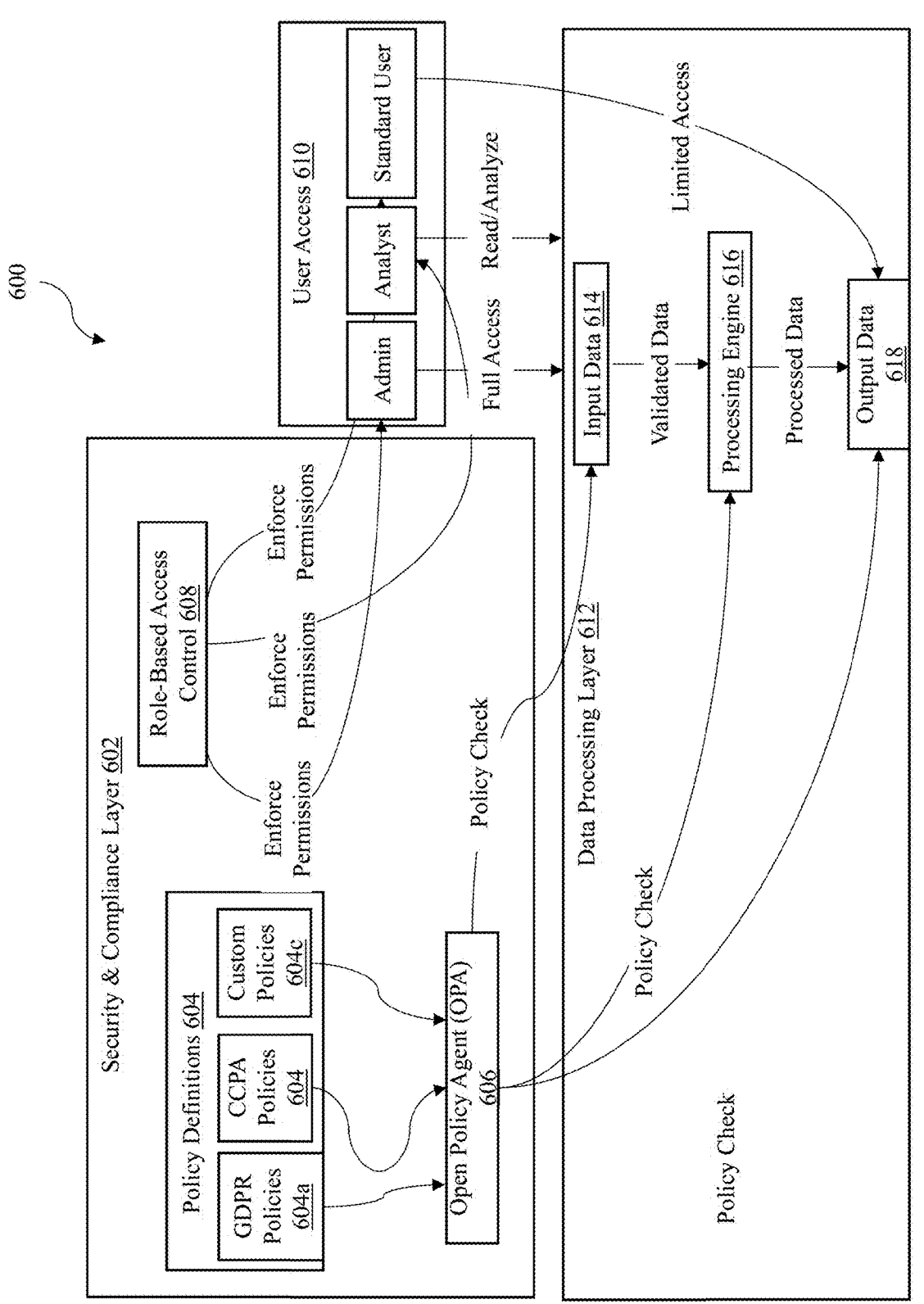
FIG. 6 is an example system that implements an authentication agent in a threat detection system.

FIG. 6 is an example system 600 that implements an authentication agent in a threat detection system. For example, the authentication agent implemented in FIG. 6 can be implemented in the threat detection system 100 of FIG. 1. In some implementations, the authentication agent can be one of the policy agents used by a threat detection system to perform federated learning techniques as described above with reference to FIG. 3. For example, the authentication agent can make real-time determinations related to user interactions with the system, using techniques such as those described below, and generate updates to subsets of parameters of models in the system based on these determinations.

In some implementations, the system 600 includes a security and compliance layer 602, a user access library 610, and a data processing layer 612. The security and compliance layer 602 can include or represent the authentication agent implemented in the threat detection system. The security and compliance layer 602 includes a policy definitions database 604. The policy definitions database 604 stores policies with user access permissions that will guide the operation of the system 600 when a user attempts to access data from the system 600. Policies stored in the policy definition database 604 can include any suitable policies. For example, the policy definition database 604 can store GDPR policies 604*a*, California Consumer Privacy Act (CCPA) policies 604*b*, and/or other custom policies 604*c*.

The security and compliance layer 602 also includes an open policy agent (OPA) 606. The OPA 606 receives policies stored in the policy definitions database 604 and user requests for access to data in the system 600. Based on the received policies and requests, the OPA 606 makes determinations related to the extent to which a user is to be granted access to data in the system 600. The OPA 606 can also access user access protocols from the user access library 610 in making its determination. Additionally, the OPA 606 can update user access protocols of the user access library 610 to help better assure alignment between the user access protocols and the policies stored in the policy definition database 604. In some implementations, the OPA 606 also logs requests by users to access data in the system 600 in a way that is not according to the determination made by the OPA 606.

In some implementations, the OPA 606 includes a Natural Language Processing (NLP) module (not shown in the figure). The NLP module ingests input including unstructured legal documents, regulatory updates, or compliance directives such as, for example, the GDPR policies, CCPA policies and/or custom policies stored in the policy definitions database 604. The NLP module processes the text of the ingested input by tokenizing, parse, and segmenting the text into a plurality of units. The plurality of units is analyzed to identify key terms using a pre-trained regulatory NLP model. The NLP module can disambiguate legal language. For example, the NLP module can capture dependencies and conditional clauses. The NLP module transforms textual requirements into machine-readable rules.

In some implementations, the NLP module is in communication with a plurality of agents associated with a MAS framework, such as the MAS framework with which the federated learning module 112 of FIG. 1 is integrated. For example, the NLP module can transmit the machine-readable rules that it generates to relevant agents of the plurality of agents associated with the MAS framework. The relevant agents can then receive updated rules from the NLP module and disseminate them to local enforcement agents. In some implementations, compliance agents ensure that updated policies are enforced consistently across the system, using the machine-readable rules generated by the NLP module as benchmarks.

In some implementations, the NLP module can be configured to use contextual learning techniques to interpret regulatory text, understanding nuances such as compliance mandates and specific legal language. In some implementations, this can facilitate recognizing regulatory shifts and generating actionable security policy adjustments in real time. For example, usage of NLP in policy applications often lacks the complexity to identify how nuanced regulatory changes should affect specific security settings. In the technologies described herein, NLP is integrated with policy logic, allowing it to identify and trigger relevant policy adaptations as regulatory requirements evolve. For example, an NLP module can be configured to monitor policy compliance and generate feedback when deviations or new requirements are detected. This feedback can be configured to trigger MAS agents to adapt policies dynamically, allowing the system to remain compliant with evolving regulations. The NLP module works in conjunction with MAS agents that manage different aspects of the system's security policy. This interaction allows the NLP to assess policy compliance dynamically and provides the system with a feedback loop, updating policies at appropriate intervals. This approach contrasts with static compliance checks, providing updated alignment with the most recent regulatory changes.

The security and compliance layer 602 also includes a Role-Based Access Control (RBAC) module 608. The RBAC module 608 helps to enforce determinations made by the OPA 606.

The user access library 610 includes information related to the type of access that is able to be granted to a user that requests access to data in the system 600. For example, the user access library 610 can include information expressing that a user defined as an administrator of the system 600 has permission to have full access (i.e., read, analyze, and edit) data in the system 600. The user access library 610 can include information expressing that a user defined as an analyst of the system 600 has permission to read and analyze data in the system 600. The user access library 610 can include information expressing that a user defined as a standard user of the system 600 has limited access to the data in the system 600. These are just examples of user access protocols that may be stored in the user access library 610. However, this disclosure is not limited in this respect, and the information stored in the user access library 610 can include any suitable user access protocols.

The data processing layer 612 can be the threat detection system in which the authentication agent of the system 600 is implemented. For example, the data processing layer 612 can include or represent the threat detection system 100 of FIG. 1. For example, one or more of the operations of the data processing layer 612 that are described below can be carried out by any of the components of the threat detection system 100 described above with reference to FIG. 1. The data processing layer 612 receives input data 614, sends validated input data to a processing engine 616 for processing, and uses the processed data to generate output data 618 that may be accessed to various extents by different users of the system 600.

User requests to access the data in the system 600 are routed to the OPA 606 of the security and compliance layer 602. In some implementations, for each user request routed to the OPA 606, the OPA 606 uses policies received from the policy definitions database 604 and/or user access protocols from the user access library 610 to determine the extent to which a user who made the user request is to be granted access to data in the system 600 in response to the request.

Upon determining the extent to which a user who made the user request is to be granted access to data in the system 600 in response to the request, the OPA 606 communicates its determination to the data processing layer 612. The user can then interact with the data processing layer 612 to access data in the system 600 according to the determination made by the OPA 606.

For example, the user can be an analyst who, according to the user protocols stored in the user access library 610, can only access and analyze (not edit) validated input data (rather than raw unprocessed data). As a result, the user will be able to access input data 614 from the data processing layer 612 once validated, and will be able to analyze processed data once processed by the processing engine 616. If the user requests to edit the data in this example, the OPA 606 denies the request and logs the request for auditing.

FIG. 7 is a flow diagram of an example process 700 for detecting cybersecurity threats in accordance with the technologies described herein. The process 700 can be executed, for example, by one or more components of a threat detection system that includes a neural network and a trained model, e.g., the threat detection system 100 of FIG. 1. For example, at least portions of the process 700 can be performed by the multimodal data fusion module 102 and the risk analysis agent 108 described in FIG. 1, and the series of layers 250 described in FIG. 2B.

Operations of the process 700 includes receiving multimodal data indicative of an access-attempt to a digital system (702). The multimodal data can include one or more modalities of data. For example, the multimodal data can include text, images, behavioral data, and/or biometrics data. Behavioral data can include location data, e.g., data indicating a location at which the access-attempt is made.

Behavioral data can include data representing user interactions with one or more input devices from which the access-attempt is made. In some implementations, the multimodal data can be substantially similar to the multi-modal data received from external sources 101 as described with reference to FIG. 1. The access-attempt can include attempts to log in to the digital system, messages sent to or from the digital system, information being entered into the digital system, or any combination of these. The access attempt can be analyzed to determine whether the access attempt represents a potential cybersecurity threat.

Operations of the process 700 generating a first embedding vector representing features of a first portion of the multimodal data (704). The first portion of the multimodal data is data of a first modality (e.g., one of text, images, behavioral data, and/or biometrics data, etc.). The system generates the first embedding vector by processing the first portion of the multimodal data using a first modality-specific layer of a neural network included in the system. In some implementations, the first modality of data includes one of text or images. In such implementations, the first modality-specific layer of the neural network used to process the first portion of the multimodal data of the first modality includes a layer of a convolutional neural network (CNN). In some implementations, the first modality-specific layer of the neural network can be substantially similar to the modality-specific layer 252a as described with reference to FIG. 2B.

Operations of the process 700 includes generating a second embedding vector representing features of a second portion of the multimodal data (706). The second portion of the multimodal data is data of a second modality (e.g., one of text, images, behavioral data, and/or biometrics data, etc.), where the second modality is different from the first modality. The system generates the second embedding vector by processing the second portion of the multimodal data using a second modality-specific layer of the neural network. In some implementations, the second modality of data includes time series data, and the second modality-specific layer of the neural network used to process the second portion of the multimodal data of the second modality is a layer of a recurrent neural network (RNN). In some implementations, the second modality-specific layer of the neural network can be substantially similar to the modality-specific layer 252b as described with reference to FIG. 2B.

Operations of the process 700 includes generating a custom embedding vector for each portions of the multimodal data (708). The custom embedding vectors are generated based on the first embedding vector and the second embedding vector using corresponding neural network layers that are jointly trained based on a common loss function.

In some implementations, each of the corresponding neural network layers that are jointly trained based on the common loss function is configured to transform the corresponding one of the first embedding vector or the second embedding vector into a shared embedding space. In such implementations, generating the custom embedding vector for each portion of the multimodal data includes transforming the first embedding vector and the second embedding vector into a shared embedding space using the corresponding neural network layers. In some implementations, the corresponding neural network layers can be substantially similar to the modality alignment layers 254a and 254b described above with reference to FIG. 2B.

In some implementations, the common loss function on which the corresponding neural network layers are jointly trained is a custom loss function. The custom loss function can be a combination of a plurality of different loss functions. For example, the custom loss function can be a weighted combination of a contrastive loss function and a triplet loss function, as described above with reference to FIG. 2B.

Operations of the process 700 includes generating a combined embedding vector from the multiple custom embedding vectors (710). The system generates the combined embedding vector using a fusion layer of the neural network. In some implementations, the fusion layer can be substantially similar to the multimodal fusion layer 256 as described with reference to FIG. 2B.

In some implementations, the fusion layer of the neural network generates the combined embedding vector by combining the custom embedding vectors in a weighted combination. In such implementations, the weights can be stored in matrices corresponding to different modalities of data. The fusion layer can select weights from the matrices to be included in the weighted combination using criteria associated with the modalities of data, as described above with reference to FIG. 2B. In some implementations, the fusion layer can include or represent the multimodal fusion layer 256 of FIG. 2B and the combined embedding vector can be the combined embedding vector generated by the multimodal fusion layer 256 of FIG. 2B.

The fusion layer is jointly trained along with the corresponding neural network layers that generate the custom embedding vectors based on the common loss function described above.

Operations of the process 700 includes processing the combined embedding vector to generate an indication of whether or not the access-attempt to the digital system is unauthorized (712). The system processes the combined embedding vector using a trained model.

In some implementations, the indication includes a risk score, such as the risk score 220 described above with reference to FIG. 2A. In some implementations, the indication includes actionable insights, such as the actionable insights produced by the recommendation engine 110 described above with reference to FIG. 2A.

In some implementations, the indication can be included in an output to a user of the digital system. For example, the indication can be included in the output 212 described above with reference to FIG. 2A. In some implementations, the indication can be displayed as part of a dashboard visualization, such as the dashboard visualization described above with reference to FIG. 2A.

FIG. 8 is a flow diagram of an example process 800 for training a neural network for detecting cybersecurity threats to a digital system in accordance with technology described herein. The process 800 can be executed, for example, by one or more components of a threat detection system, e.g., the threat detection system 100 of FIG. 1. For example, at least portions of the process 800 can be performed by the multimodal data fusion module 102 and the RA agent 108 described in FIG. 1, and the series of layers 250 described in FIG. 2B.

Operations of the process 800 includes receiving multimodal data for training the neural network (802). The multimodal data includes data of one or more modalities. The multimodal data can include one or more of biometric data (e.g., facial data), data related to text logs, images, data related to behavior of a user of the digital system (e.g., typing speed or location data), data related to network traffic to and from the system or device, or any combination of these.

In some implementations, in some implementations, the multimodal includes biometric data and data related to behavior of a user of the digital system (i.e., behavioral data). In such implementations, the behavioral data can include at least one of: location data corresponding to an access attempt to the digital system or data representing user-interactions with one or more input devices corresponding to the access attempt. In some implementations, the multimodal data can be substantially similar to the multimodal data received from external sources 101 as described with reference to FIG. 1.

Operations of the process 800 includes generating one or more first embedding vectors representing features of a first portion of the multimodal data (804). The first portion of the multimodal data is data of a first modality. The system generates one or more first embedding vectors representing features of the first portion of the multimodal data by processing the first portion of the multimodal data using a first modality-specific layer of the neural network. In some implementations, the operation 804 can be substantially similar to the operation 704 described with reference to FIG. 7. In some implementations, the first modality-specific layer of the neural network can be substantially similar to the modality-specific layer 252*a* as described with reference to FIG. 2B.

Operations of the process 800 includes generating one or more second embedding vectors representing features of a second portion of the multimodal data (806). The second portion of the multimodal data is data of a second modality, where the second modality is different from the first modality. The system generates one or more second embedding vectors representing features of a second portion of the multimodal data by processing the second portion of the multi-modal data using a second modality-specific layer of the neural network. In some implementations, the operation 806 can be substantially similar to the operation 706 described with reference to FIG. 7. In some implementations, the second modality-specific layer of the neural network can be substantially similar to the modality-specific layer 252*b* as described with reference to FIG. 2B.

For simplicity, this specification only describes two modalities of data being processed in the process 800. However, this specification is not limited in this respect. While the process 800 includes processing at least two modalities of data, any suitable number of modalities of data can be processed in the process 800.

Operations of the process 800 includes training a first layer and a second layer of the neural network, such that the first and second layers of the neural network are configured to generate, from the first embedding vectors and the second embedding vectors, respectively, corresponding custom embedding vectors that represent corresponding portions of the multi-modal data in a shared embedding space (808). The first layer and the second layer are jointly trained based on a common loss function generated as a weighted combination of a first loss function and at least a second loss function. The first and second loss functions are selected based on characteristics of the first and second modality.

In implementations in which the multimodal data includes behavioral and biometric data, the first loss function is configured to cluster embeddings generated from the behavioral and biometric data of a user close to one another. In such implementations, the first loss function can be contrastive loss. In some implementations, the contrastive loss function can be computed as described above with reference to FIG. 2B.

In some implementations, the second loss function is configured to cluster embeddings corresponding to a particular user close to one another and cluster embedding corresponding to different users away from one another. In such implementations, the second loss function can be triplet loss. In some implementations, the triplet loss function can be computed as described above with reference to FIG. 2B.

In some implementations, the common loss function is adjusted during the training of the neural network. In such implementations, the weights associated with the weighted combination of the first loss function and at least the second loss function can be adjusted based on a degree of similarity among two or more custom embedding vectors of the custom embedding vectors generated by the first and second layers. In some implementations, the weights associated with the weighted combination can be dynamically determined during training according to the process described above with reference to FIG. 2B.

In such implementations, adjusting the common loss function can include adding a third loss function in the weighted combination. The third loss function can be any suitable loss function.

As mentioned above, for simplicity, this specification only describes two modalities of data being processed in the process 800, and therefore only describes two layers of the neural network being trained to generate custom embedding vectors. However, this specification is not limited in this respect. While the process 800 includes processing at least two modalities of data, any suitable number of modalities of data can be processed in the process 800 and a corresponding suitable number of layers of the neural network can be trained to generate corresponding custom embedding vectors.

Operations of the process 800 includes training a third layer of the neural network to identify patterns across multiple modalities (810). The third layer of the neural network is trained based on a plurality of the custom embedding vectors that the first and second layers are configured to generate.

The third layer is jointly trained along with the first and second layers based on the common loss function, as described above.

Figure 9:
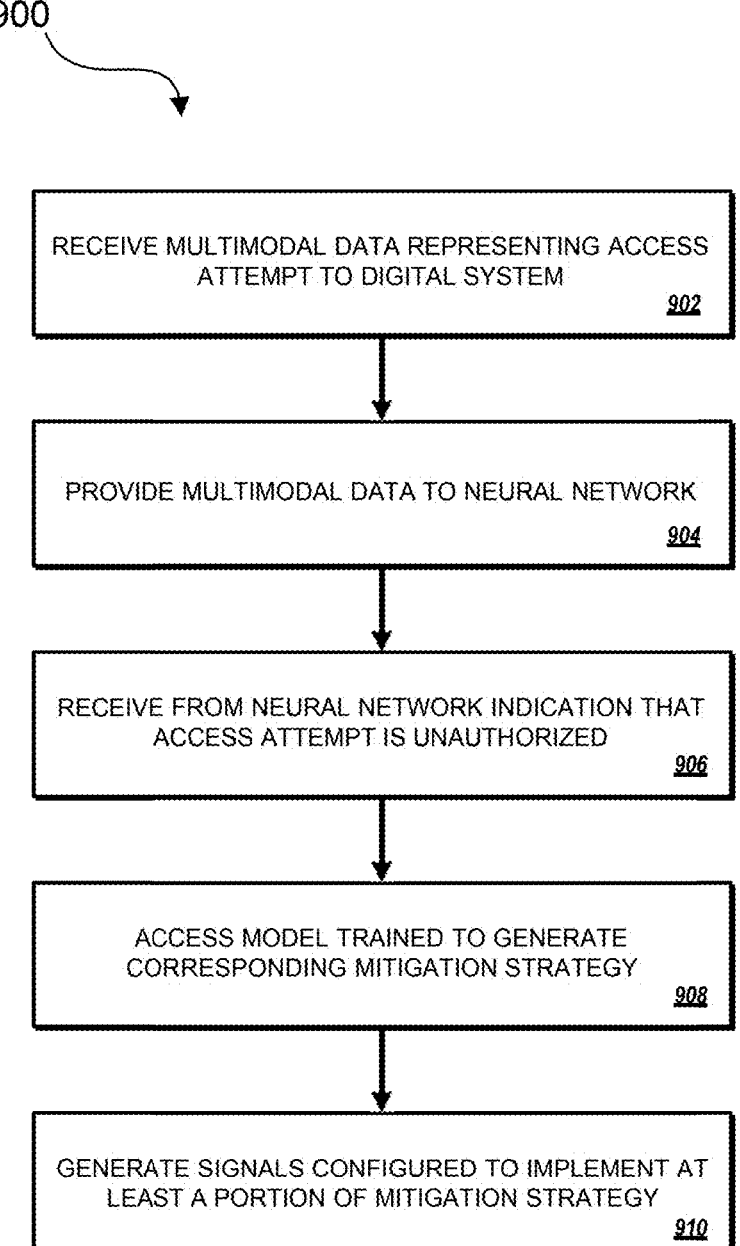
FIG. 9 is a flow diagram of an example process for mitigating cybersecurity threats to a digital system.

In some implementations, the third layer can be configured to generate a combined embedding vector that is based on the plurality of custom embedding vectors generated by the first and second layers. In some implementations, the third layer can be substantially similar to the multimodal fusion layer 256 described above with reference to FIG. 2B. All layers of the neural network trained in the process 800 are trained to generate an indication whether or not multimodal attempts to access the digital system are unauthorized. FIG. 9 is a flow diagram of an example process 900 for mitigating cybersecurity threats to a digital system in accordance with technology described herein. The process 900 can be executed, for example, by one or more components of a threat detection system, e.g., the threat detection system 100 of FIG. 1. For example, at least portions of the process 900 can be performed by the recommendation engine 110 described in FIG. 1 and FIG. 2A.

Operations of the process 900 includes receiving multimodal data representing an access attempt to a digital system (902). In some implementations, the operation 902 can be substantially similar to the operation 702 described with reference to FIG. 7. For example, the multimodal data can include one or more modalities of data, as described above. The access attempt can include attempts to log in to the digital system, messages sent to or from the digital system, information being entered into the digital system, or any combination of these. The access attempt can be a potential cybersecurity threat. In some implementations, the multimodal data can be substantially similar to the multi-modal data received from external sources 101 as described with reference to FIG. 1.

Operations of the process 900 includes providing the multimodal data to a neural network (904). The layers of the neural network are trained to generate an indication whether or not multimodal attempts to access the digital system are unauthorized. In some implementations, the neural network can be substantially similar to one or more of the multimodal data fusion module 102 and the risk score module 208 described with reference to FIG. 2A. In some implementations, the neural network can be substantially similar to one or more of the modality-specific layers 252, the modality alignment layers 254 and the multimodal fusion layer 256 described with reference to FIG. 2B.

Operations of the process 900 includes receiving from the neural network an indication that the access attempt is unauthorized (906). The indication can be in any suitable format. In some implementations, the indication can be substantially similar to the risk score 220 generated by the risk score module 208 described with reference to FIG. 2A. In some implementations, the indication can be substantially similar to the combined embedding vector generated by the multimodal fusion layer 256 described with reference to FIG. 2B.

Operations of the process 900 includes accessing a machine learning model trained to generate a mitigation strategy corresponding to the indication that the access attempt is unauthorized (908). The machine learning model is trained to generate the corresponding mitigation strategy based on a plurality of features of the multimodal data. The system accesses a machine learning model trained to generate a mitigation strategy corresponding to the indication that the access attempt is unauthorized in response to receiving the indication that the access attempt to the digital system is unauthorized. The machine learning model that is accessed by the system includes a decision tree that is updated using a reinforcement learning process based on information on effectiveness of prior responses to other cybersecurity threats.

In some implementations, the machine learning model can be substantially similar to the recommendation engine 110 described with reference to FIG. 2A. In some implementations, the machine learning model uses the decision tree to classify the indication, as described with reference to FIG. 2A. In some implementations, the machine learning model uses the decision tree to determine a response to the access attempt, as described with reference to FIG. 2A.

The decision tree included in the machine learning model is updated using a reinforcement learning process in which a reinforcement learning agent generates rewards using information about the effectiveness of prior responses to other cybersecurity threats. The machine learning model adjusts features of the decision tree using the generated rewards, as described with reference to FIG. 2A.

In some implementations, the information on effectiveness of the prior responses to other cybersecurity threats is stored in a database accessible to the machine learning model. The database can be configured to store features of the other cybersecurity threats and historical data indicative of corresponding prior responses to the other cybersecurity threats. The database can include information on one or more security policies associated with the other cybersecurity threats. After generating a mitigation strategy in response to an access attempt, the machine learning model can store information on the access attempt and corresponding mitigation strategy in the database. The machine learning model can also determine an effectiveness of the generated mitigation strategy and update the database to store information on the effectiveness of the generated mitigation strategy. This updated database can then be used in the reinforcement learning process to update the decision tree. The database can be substantially similar to the database described with reference to FIG. 2A.

In some implementations, the machine learning model is trained to generate the mitigation strategy by generating a measure of similarity of the access attempt to other cybersecurity threats based on the features of the multimodal data and the features of the other cybersecurity threats that are stored in the database described above. The machine learning model then generates the mitigation strategy based on the generated measure of similarity. In such implementations, the machine learning model can use a query matrix algorithm to generate the measure of similarity, as described with reference to FIG. 2A.

Operations of the process 900 includes generating one or more signals configured to implement at least a portion of the mitigation strategy (910). For example, the one or more signals can include any portion of the output 212 described with reference to FIG. 2A. The one or more signals can include or represent the final output generated by the output layer 260 described with reference to FIG. 2B.

Figure 10:
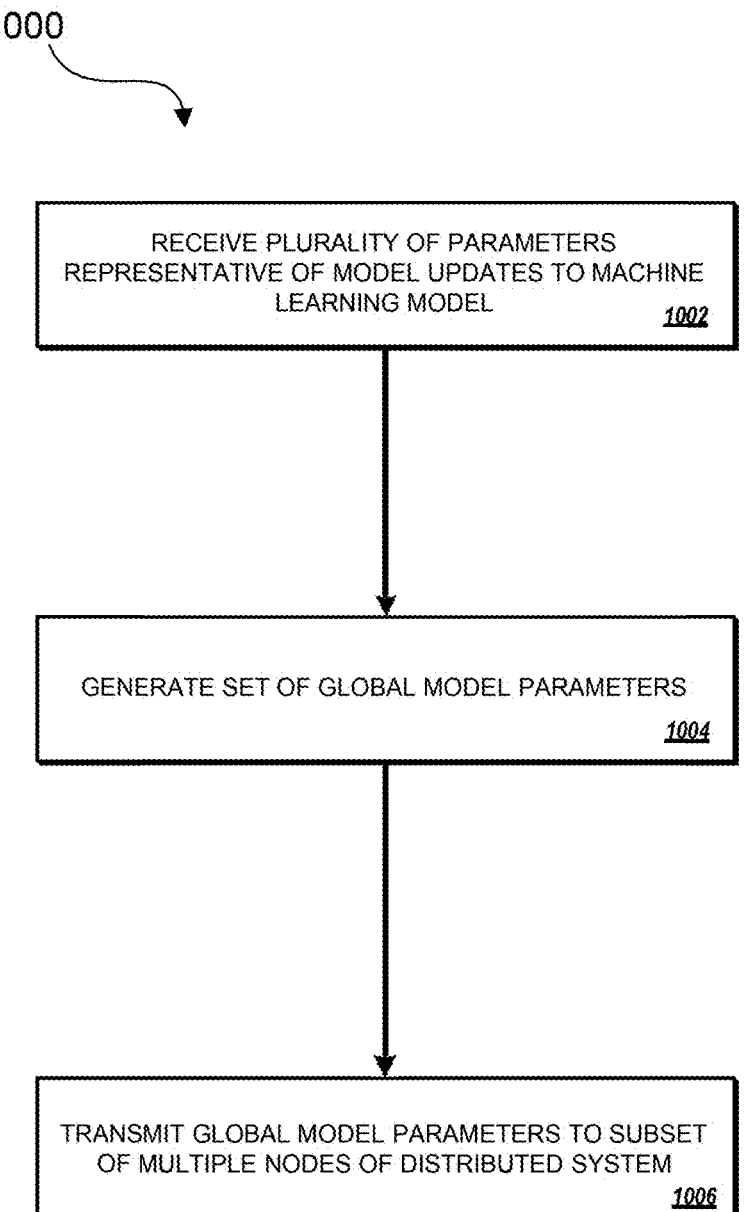
FIG. 10 is a flow diagram of an example process for coordinating cybersecurity threat detection across a distributed system.

FIG. 10 is a flow diagram of an example process 1000 for coordinating cybersecurity threat detection across a distributed system in accordance with technology described herein. The process 1000 can be executed by a central aggregation node, e.g., the central aggregation node 302 of FIG. 3. The distributed system includes multiple nodes. For example, the distributed system can include one or more of local nodes 304, 306, 308, and 310 of FIG. 3.

Operations of the process 1000 includes receiving, from each node of the multiple nodes of the distributed system, a plurality of parameters representative of model updates to a corresponding machine learning model that is trained at the corresponding node (1002). The corresponding machine learning model at each node is trained to detect cybersecurity threats within a context of the corresponding node.

For example, each node of the multiple nodes can be located in a different environment, such that the context of each node is different and depends on the environment in which the node is located. Each node of the multiple nodes can be part of a different system or part of a system, such that the context of each node is different and depends on the system or part of the system of which the node is a part.

In some implementations, the corresponding machine learning model at each node is trained to detect the cybersecurity threats based on multimodal data that includes data of a first modality and at least a second modality different from the first modality. In such implementations, each of the first modality and the second modality can include one of text, images, behavioral data, or biometrics data. In some implementations, the multimodal data can be substantially similar to the local data 304*a*, 306*a*, 308*a*, and 310*a* described with reference to FIG. 3. In some implementations, the training of the corresponding machine learning model at each node can be substantially similar to the local model training 304*b*, 306*b*, 308*b*, and 310*b* described with reference to FIG. 3.

In some implementations, data used in training the corresponding machine-learning model at the corresponding node of the distributed system is secured within a trusted execution environment (TEE) at the corresponding node, such as the TEEs described with reference to FIG. 3. In such implementations, data used in training the corresponding machine-learning model at the corresponding node of the distributed system can be encrypted using encryption methods described with reference to FIG. 3. In such implementations, each TEE can include hardware-level optimizations to maintain efficient processing while employing encryption, as described with reference to FIG. 3.

In some implementations, the plurality of parameters representative of the model updates includes derivatives of one or more loss functions associated with the model parameters. In some implementations, the plurality of parameters representative of the model updates includes a subset of all model updates for the corresponding machine-learning model.

Operations of the process 1000 includes generating a set of global model parameters (1004). The generated set of global model parameters is based on the parameters received from the multiple nodes. The set of global model parameters represents global updates to the individual machine learning models trained at the multiple nodes of the distributed system.

In some implementations, the system generates the set of global model parameters by aggregating or combining model updates received from the individual nodes, as described with reference to FIG. 3. For example, the system can generate the set of global model parameters by combining model updates from the individual nodes in a weighted combination. The weight for a particular model update in the weighted combination can be determined based on a characteristic of data used in training the machine learning model at the corresponding node. The characteristic of data can be the size of the data, the quality of the data, or any other suitable characteristic of the data.

Operations of the process 1000 includes transmitting the set of global model parameters to at least a subset of the multiple nodes of the distributed system (1006). The global model parameters in the set are configured to update local model parameters of the corresponding machine learning model at each node of the subset of multiple nodes.

In some implementations, the system includes one or more policy agents that generate updates to subsets of parameters of the individual machine learning models based on intermediate outputs generated by the system and/or the machine learning models. For example, the system can be integrated with a multi-agent system (MAS) framework, such as the MAS framework described with reference to FIG. 3.

Figure 11:
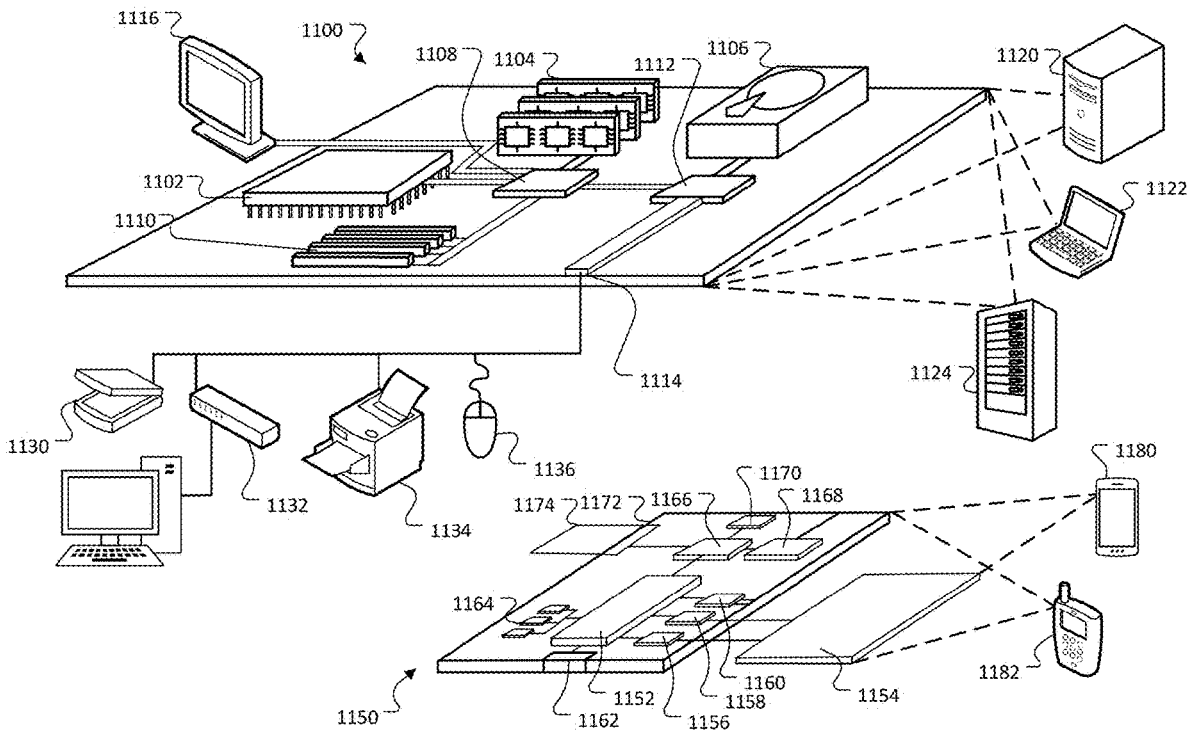
FIG. 11 is a schematic diagram showing a computing device and a mobile device that can be used in implementing aspects of the technology described herein.

FIG. 11 shows an example of a computing device 1100 and a mobile computing device 1150 that are employed to execute implementations of the present disclosure. The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 1100 and/or the mobile computing device 1150 can form at least a portion of the threat detection system (e.g., the threat detection system 100) described above. The computing device 1100 and/or the mobile computing device 1150 can also form at least a portion of the systems 300, 400, and 600 described above. In some implementations, the systems described above can be implemented using a cloud infrastructure including multiple computing devices 1100 and/or mobile computing devices 1150.

The computing device 1100 includes a processor 1102, a memory 1104, a storage device 1106, a high-speed interface 1108, and a low-speed interface 1112. In some implementations, the high-speed interface 1108 connects to the memory 1104 and multiple high-speed expansion ports 1110. In some implementations, the low-speed interface 1112 connects to a low-speed expansion port 1114 and the storage device 1104. Each of the processor 1102, the memory 1104, the storage device 1106, the high-speed interface 1108, the high-speed expansion ports 1110, and the low-speed interface 1112, are interconnected using various buses, and may be mounted on a common motherboard or in other manners as appropriate. The processor 1102 can process instructions for execution within the computing device 1100, including instructions stored in the memory 1104 and/or on the storage device 1106 to display graphical information for a graphical user interface (GUI) on an external input/output device, such as a display 1116 coupled to the high-speed interface 1108. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 may also be another form of a computer-readable medium, such as a magnetic or optical disk.

The storage device 1106 is capable of providing mass storage for the computing device 1100. In some implementations, the storage device 1106 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 1102, perform one or more methods, such as those described above. The instructions can also be stored by one or more storage devices, such as computer-readable or machine-readable mediums, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards. In the implementation, the low-speed interface 1112 is coupled to the storage device 1106 and the low-speed expansion port 1114. The low-speed expansion port 1114, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 1114 through a network adapter. Such network input/output devices may include, for example, a switch or router.

The computing device 1100 may be implemented in a number of different forms, as shown in the FIG. 11. For example, it may be implemented as a server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device, such as a mobile computing device 1150. Each of such devices may contain one or more of the computing device 1100 and the mobile computing device 1150, and an entire system may be made up of multiple computing devices communicating with each other.

The mobile computing device 1150 includes a processor 1152; a memory 1164; an input/output device, such as a display 1154; a communication interface 1166; and a transceiver 1168; among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate. In some implementations, the mobile computing device 1150 may include a camera device(s).

The processor 1152 can execute instructions within the mobile computing device 1150, including instructions stored in the memory 1164. The processor 1152 may be implemented as a chipset of chips that include separate and multiple analog and digital processors. For example, the processor 1152 may be a Complex Instruction Set Computers (CISC) processor, a Reduced Instruction Set Computer (RISC) processor, or a Minimal Instruction Set Computer (MISC) processor. The processor 1152 may provide, for example, for coordination of the other components of the mobile computing device 1150, such as control of user interfaces (UIs), applications run by the mobile computing device 1150, and/or wireless communication by the mobile computing device 1150.

The processor 1152 may communicate with a user through a control interface 1158 and a display interface 1156 coupled to the display 1154. The display 1154 may be, for example, a Thin-Film-Transistor Liquid Crystal Display (TFT) display, an Organic Light Emitting Diode (OLED) display, or other appropriate display technology. The display interface 1156 may include appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a Single in Line Memory Module (SIMM) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provided as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 1152, perform one or more methods, such as those described above. The instructions can also be stored by one or more storage devices, such as one or more computer-readable or machine-readable mediums, such as the memory 1164, the expansion memory 1174, or memory on the processor 1152. In some implementations, the instructions can be received in a propagated signal, such as, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS), Internet Protocol (IP) Multimedia Subsystem (IMS) technologies, and 6G technologies. Such communication may occur, for example, through the transceiver 1168 using a radio frequency. In addition, short-range communication, such as using a Bluetooth or Wi-Fi, may occur. In addition, a Global Positioning System (GPS) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in FIG. 11. For example, it may be implemented in the system described with respect to FIG. 1. Other implementations may include a phone device 1180, a personal digital assistant 1182, and a tablet device (not shown). The mobile computing device 1150 may also be implemented as a component of a smartphone, Augmented Reality (AR) device, or other similar mobile device.

The computing device 1100 may be implemented in the system 100 described above with respect to FIG. 1.

Computing device 1100 and/or 1150 can also include USB flash drives. The USB flash drives may store operating systems and other applications. The USB flash drives can include input/output components, such as a wireless transmitter or USB connector that may be inserted into a USB port of another computing device.

While this specification contains many specific implementation details, these should not be construed as limitations on the scope of what is being claimed, which is defined by the claims themselves, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for implementing coordinated cybersecurity threat detection across a distributed system, the system comprising:

a non-transitory storage device configured to store computer-readable instructions; and one or more processing devices configured to execute the computer-readable instructions, which when executed cause the one or more processing devices to perform operations comprising:

receiving, from each node of multiple nodes of the distributed system, a plurality of parameters representative of model updates to a corresponding machine-learning model that is trained at the corresponding node of the distributed system, wherein:

the corresponding machine learning model is trained to detect cybersecurity threats within a context of the corresponding node based on local data received by the corresponding node; and the model updates are learned from the local data, generating, based on the parameters received from the multiple nodes, a set of global model parameters that represents global updates to the individual machine-learning models trained at the multiple nodes of the distributed system; and transmitting to each node of at least a subset of the multiple nodes of the distributed system, a respective selected subset of the global model parameters, wherein:

the global model parameters of the respective selected subset are configured to update local model parameters of the corresponding machine learning model at the node;

the size of the respective selected subset is smaller than the size of all global model parameters; and the respective selected subset is identified based on a potential cybersecurity threat context of the corresponding node.

2. The system of claim 1, wherein the corresponding machine-learning model on a node of the multiple nodes of the distributed system is trained to detect the cybersecurity threats based on multi-modal data that includes data of a first modality and at least a second modality different from the first modality.

3. The system of claim 2, wherein each of the first modality and the second modality comprises one of: text, images, behavioral data, or biometrics data.

4. The system of claim 1, wherein generating the global model parameters comprises combining the model updates from individual nodes in a weighted combination.

5. The system of claim 4, wherein a weight for a particular model update in the weighted combination is determined based on a characteristic of data used in training the machine learning model at the corresponding node.

6. The system of claim 1, wherein data used in training the corresponding machine-learning model at the corresponding node of the distributed system is secured within a trusted execution environment (TEE) at the corresponding node.

7. The system of claim 1, wherein the plurality of parameters representative of the model updates comprises derivatives of one or more loss functions associated with the model parameters.

8. The system of claim 1, wherein the plurality of parameters representative of the model updates comprises a subset of all model updates for the corresponding machine-learning model.

9. A method for implementing coordinated cybersecurity threat detection across a distributed system, the method comprising:

receiving, from each node of multiple nodes of the distributed system, a plurality of parameters representative of model updates to a corresponding machine-learning model that is trained at the corresponding node of the distributed system, wherein:

the corresponding machine learning model is trained to detect cybersecurity threats within a context of the corresponding node based on local data received by the corresponding node; and the model updates are learned from the local data, generating, based on the parameters received from the multiple nodes, a set of global model parameters that represents global updates to the individual machine-learning models trained at the multiple nodes of the distributed system; and transmitting to each node of at least a subset of the multiple nodes of the distributed system, a respective selected subset of the global model parameters, wherein:

the global model parameters of the respective selected subset are configured to update local model parameters of the corresponding machine learning model at the node;

the size of the respective selected subset is smaller than the size of all global model parameters; and the respective selected subset is identified based on a potential cybersecurity threat context of the corresponding node.

10. The method of claim 9, wherein the corresponding machine-learning model on a node of the multiple nodes of the distributed method is trained to detect the cybersecurity threats based on multi-modal data that includes data of a first modality and at least a second modality different from the first modality.

11. The method of claim 10, wherein each of the first modality and the second modality comprises one of: text, images, behavioral data, or biometrics data.

12. The method of claim 9, wherein:

generating the global model parameters comprises combining the model updates from individual nodes in a weighted combination; and a weight for a particular model update in the weighted combination is determined based on a characteristic of data used in training the machine learning model at the corresponding node.

13. The method of claim 9, wherein data used in training the corresponding machine-learning model at the corresponding node of the distributed method is secured within a trusted execution environment (TEE) at the corresponding node.

14. The method of claim 9, wherein the plurality of parameters representative of the model updates comprises one of: derivatives of one or more loss functions associated with the model parameters and a subset of all model updates for the corresponding machine-learning model.

15. One or more non-transitory computer-readable storage media encoded with computer program instructions that when executed by one or more computers cause the one or more computers to perform operations comprising:

receiving, from each node of multiple nodes of the distributed system, a plurality of parameters representative of model updates to a corresponding machine-learning model that is trained at the corresponding node of the distributed system, wherein:

the corresponding machine learning model is trained to detect cybersecurity threats within a context of the corresponding node based on local data received by the corresponding node; and the model updates are learned from the local data, generating, based on the parameters received from the multiple nodes, a set of global model parameters that represents global updates to the individual machine-learning models trained at the multiple nodes of the distributed system; and transmitting to each node of at least a subset of the multiple nodes of the distributed system, a respective selected subset of the global model parameters, wherein:

the global model parameters of the respective selected subset are configured to update local model parameters of the corresponding machine learning model at the node;

the size of the respective selected subset is smaller than the size of all global model parameters; and the respective selected subset is identified based on a potential cybersecurity threat context of the corresponding node.

16. The one or more non-transitory computer-readable storage media of claim 15, wherein the corresponding machine-learning model on a node of the multiple nodes of the distributed system is trained to detect the cybersecurity threats based on multi-modal data that includes data of a first modality and at least a second modality different from the first modality.

17. The one or more non-transitory computer-readable storage media of claim 16, wherein each of the first modality and the second modality comprises one of: text, images, behavioral data, or biometrics data.

18. The one or more non-transitory computer-readable storage media of claim 15, wherein:

generating the global model parameters comprises combining the model updates from individual nodes in a weighted combination; and a weight for a particular model update in the weighted combination is determined based on a characteristic of data used in training the machine learning model at the corresponding node.

19. The one or more non-transitory computer-readable storage media of claim 15, wherein data used in training the corresponding machine-learning model at the corresponding node of the distributed system is secured within a trusted execution environment (TEE) at the corresponding node.

20. The one or more non-transitory computer-readable storage media of claim 15, wherein the plurality of parameters representative of the model updates comprises one of: derivatives of one or more loss functions associated with the model parameters and a subset of all model updates for the corresponding machine-learning model.

* * * * *